US009998661B1

(12) United States Patent
Banta et al.

(10) Patent No.: US 9,998,661 B1
(45) Date of Patent: Jun. 12, 2018

(54) PANORAMIC CAMERA ENCLOSURE

(71) Applicant: Amazon Technologies, Inc., Seattle, WA (US)

(72) Inventors: William Christopher Banta, Lafayette, CA (US); Nathaniel Bubis, Tel Aviv (IL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 310 days.

(21) Appl. No.: 14/711,018

(22) Filed: May 13, 2015

Related U.S. Application Data

(60) Provisional application No. 61/992,736, filed on May 13, 2014, provisional application No. 62/010,401, filed on Jun. 10, 2014.

(51) Int. Cl.
H04N 5/232 (2006.01)
H04N 5/225 (2006.01)
H04N 5/265 (2006.01)

(52) U.S. Cl.
CPC ....... H04N 5/23238 (2013.01); H04N 5/2252 (2013.01); H04N 5/265 (2013.01)

(58) Field of Classification Search
CPC .. H04N 5/23238; H04N 5/2252; H04N 5/265; H04N 5/3415; G02B 13/06; G03B 37/00; G03B 37/04; G06T 3/4038

(Continued)

(56) References Cited

U.S. PATENT DOCUMENTS 3,141,397 A * 7/1964 McNeil ................. G03B 17/08
352/69
5,143,009 A * 9/1992 Laukien .................. B63G 8/38
114/66

(Continued)

FOREIGN PATENT DOCUMENTS

JP 2004070002 A * 3/2004
JP 2004080088 A * 3/2004

(Continued)

OTHER PUBLICATIONS

Author Unknown, "Specifications the New 360Heros 360Abyss," Underwater 360 Video by 360Heros, Available at: http://360abyss.com/#!/specifications/, 1 page, (printed May 13, 2015).

(Continued)

Primary Examiner — Christopher S Kelley
Assistant Examiner — Kathleen Walsh
(74) Attorney, Agent, or Firm — K&L Gates LLP

(57) ABSTRACT

Various examples are directed to a panoramic camera system comprising a first image sensor, a second image sensor and an enclosure. The first image sensor may have a first in-air field-of-view and the second image sensor may have a second in-air field-of-view. The first in-air field-of-view may overlap the second in-air field-of-view by greater than a threshold amount. The enclosure may comprise a curved outer surface. An alternate medium field-of-view of the first image sensor may overlap an alternate medium field-of-view of the second image sensor by greater than the threshold amount. The panoramic camera system may also comprise an image processor that is programmed to determine that the first image sensor and the second image sensor are within the enclosure. The panoramic camera system may stitch frames captured by the first and second image sensors considering an alternate medium stitching parameter.

19 Claims, 17 Drawing Sheets

(58) Field of Classification Search
USPC .................................................. 348/36, 38
See application file for complete search history.

(56) References Cited

U.S. PATENT DOCUMENTS

| | | | |
|---|---|---|---|
| 6,043,837 A | 3/2000 | Driscoll, Jr. et al. | |
| 6,611,241 B1 | 8/2003 | Firester et al. | |
| 6,788,333 B1 | 9/2004 | Uyttendaele et al. | |
| 7,862,394 B2* | 1/2011 | Larson | B63B 22/20 348/81 |
| 8,334,905 B2 | 12/2012 | Bhan | |
| 8,605,783 B2 | 12/2013 | El-Saban et al. | |
| 8,687,070 B2 | 4/2014 | Chen et al. | |
| 9,152,019 B2* | 10/2015 | Kintner | G03B 17/561 |
| 2009/0058988 A1* | 3/2009 | Strzempko | G06T 3/4038 348/36 |
| 2009/0201390 A1* | 8/2009 | Mimura | H04N 5/232 348/222.1 |
| 2010/0066809 A1* | 3/2010 | Cormack | H04N 7/185 348/36 |
| 2012/0154521 A1* | 6/2012 | Townsend | H04N 5/23238 348/36 |
| 2013/0141523 A1 | 6/2013 | Banta et al. | |
| 2013/0141526 A1 | 6/2013 | Banta et al. | |
| 2014/0071264 A1* | 3/2014 | Seo | H04N 9/735 348/81 |
| 2014/0192144 A1* | 7/2014 | St. Clair | H04N 5/2251 348/36 |
| 2015/0002621 A1* | 1/2015 | Ratner | G03B 17/08 348/36 |

FOREIGN PATENT DOCUMENTS

| | | | | |
|---|---|---|---|---|
| KR | 20120075899 A | * | 7/2012 | |
| WO | WO 2011143622 A2 | * | 11/2011 | ............. F16M 11/04 |

OTHER PUBLICATIONS

Author Unknown, "Spherical Imaging," Tuatara Systems, Available at: http://www.tuatarasystems.com/spherical.html, 2 pages, (printed May 5, 2015).

Author Unknown, "Underwater 360 Video by 360Heros," Available at: http://360abyss.com/#, 1 page, (printed May 13, 2015).

* cited by examiner

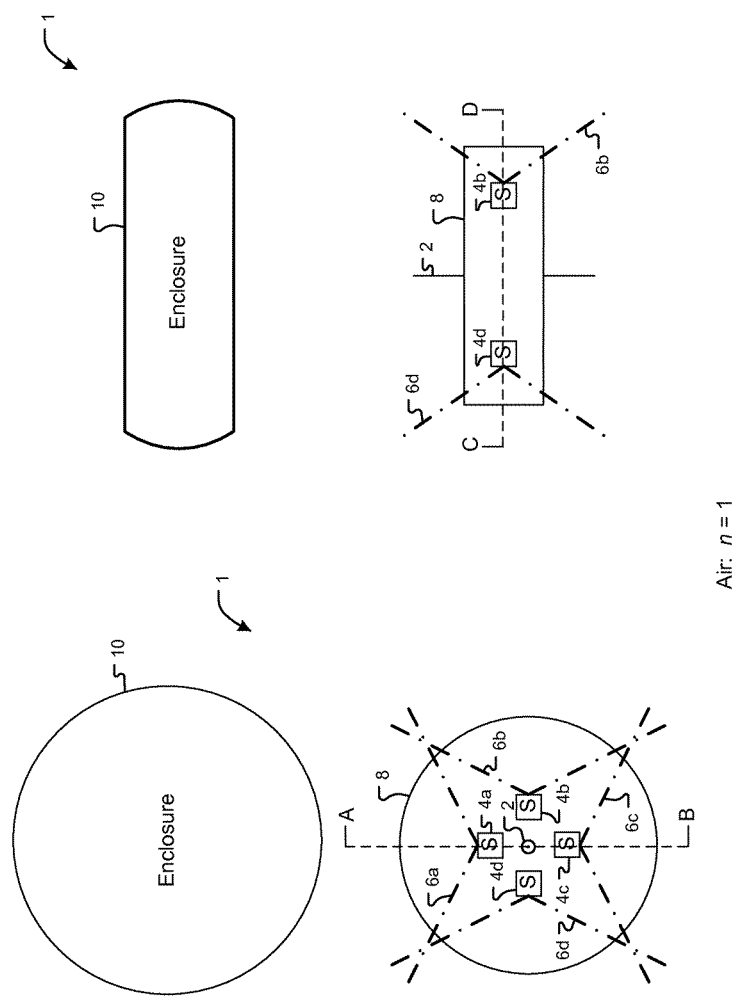

US 9,998,661 B1

PANORAMIC CAMERA ENCLOSURE

CROSS-REFERENCE TO RELATED APPLICATIONS

This application claims the benefit of U.S. Provisional Application No. 61/992,736, filed May 13, 2014, and U.S. Provisional Application No. 62/010,401, filed Jun. 10, 2014, the disclosures of which are incorporated herein in their entirety.

BACKGROUND

Panoramic camera systems are used to capture panoramic images and/or videos. Some panoramic camera systems include multiple image sensors with overlapping fields-of-view. An image processor stitches images and/or videos from the image sensors into a single panoramic image and/or video. When a panoramic camera is used in water or another medium having a refractive index greater than air, the fields-of-view of the image sensors become smaller. This reduces or eliminates overlap between the fields-of-view of the image sensors, making image stitching more difficult or even impossible.

BRIEF DESCRIPTION OF DRAWINGS

FIGS. 1A and 1B are cross-sectional diagrams showing one example of a panoramic camera system positioned outside of a removable enclosure and positioned in air.

DETAILED DESCRIPTION

Figure 2B:
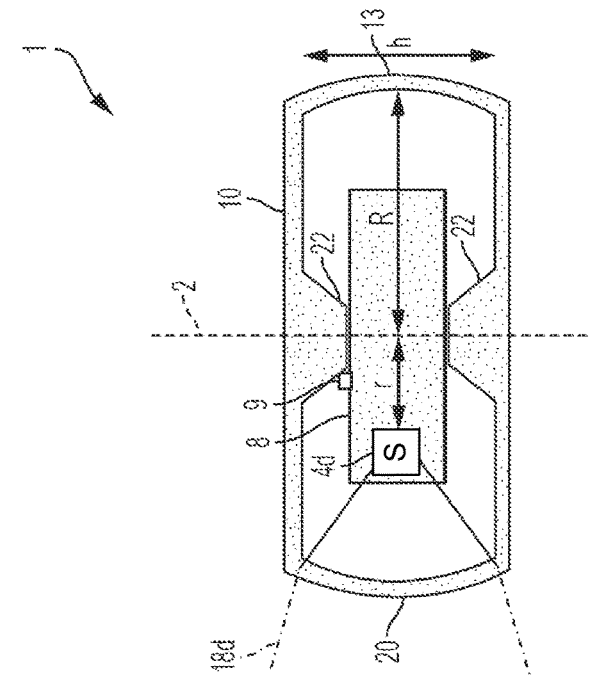
FIGS. 2A and 2B are cross-sectional diagrams showing one example of the panoramic camera system of FIGS. 1A and 1B surrounded by the removable enclosure and positioned in an alternate medium.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to a panoramic camera system comprising a removable enclosure that corrects the fields-of-view of the image sensors for use in water or another alternate medium having a refractive index greater than one. The panoramic camera system may have any suitable number of image sensors. In some examples, the panoramic camera system has four image sensors, as described herein.

Each image sensor has a field-of-view. A field-of-view is an angle through which the image sensor receives radiation, such as visible light. The field-of-view may be a solid angle, although when symmetric optics are used (e.g., circular lenses) the field-of-view may be described as a two-dimensional angle. An image sensor's field-of-view depends on the lenses and/or other optical components present and the refractive index of the surrounding medium. Herein, image sensors are described by several different fields-of-view. For example, each image sensor is described by an in-air field-of-view. The in-air field-of-view of an image sensor is the field-of-view of the image sensor when the panoramic camera system is used in-air (e.g., the surrounding medium is air) and outside of the disclosed enclosure. Each image sensor may also be described by an alternate medium field-of-view or an AM field-of-view. The AM field-of-view of an image sensor is the field-of-view of the image sensor when the panoramic camera system is used in an alternate medium (e.g., other than air) and inside the disclosed enclosure. The alternate medium may be any suitable medium having a refractive index different from the refractive index of air. In some examples, the alternate medium has a refractive index greater than air. In some examples, the alternate medium is water. Each image sensor may also be described by an effective field-of-view. The effective field-of-view is the field-of-view of an image sensor in its current configuration, including medium in which the panoramic camera system is used and the enclosure or any other optical components used with the image sensor, etc.

The panoramic camera system may be configured such that the in-air fields-of-view of the image sensors overlap. This means that when the panoramic camera system is used in air, image data captured at a given time from a single image sensor (sometimes referred to herein as a frame) may overlap with one or more other sets of image data (e.g., frames) captured at substantially the same time by another image sensor included in the device (e.g., because the fields-of-view of the image sensors overlap). This may allow an optical image processor to stitch the frames of image data together into a single panoramic image. Panoramic images can then be combined in time to have a panoramic video that captures the combined fields-of-view of multiple image sensors of a single device. When the panoramic camera system is used in water or another alternate medium having a refractive index greater than that of air, it may be placed within the removable enclosure. The enclosure may comprise a curved outer surface, which may have a constant curvature radius. The curved outer surface may act as a lens that increases the effective fields-of-view of the image sensors. When the panoramic camera system is used underwater or in another alternate medium, the alternate medium or AM fields-of-view of the image sensors may overlap, as described herein. For example, the radius of the curved outer surface may be selected to increase the AM fields-of-view of the image sensors to bring about overlap in the alternate medium. Accordingly, a user may place the panoramic camera system in the disclosed enclosure and then submerge the panoramic camera system in water or another alternate medium. Because the AM fields-of-view of the image sensors overlap in a manner similar to the in-air fields-of-view, the optical image processor may similarly stitch images and/or videos from the image sensors to generate panoramic images and/or videos. In some examples, the radius of the curved outer surface may be selected such that the AM fields-of-view of the image sensors are substantially equal to the image sensors' in-air fields-of-view.

In various examples, the panoramic camera system may be configured to modify the processing of frames when it is used in water or another alternate medium (e.g., in the enclosure). The panoramic camera system may determine when it is to be used in an alternate medium. For example, the panoramic camera system may sense that the enclosure has been placed around the image sensors, either from a switch, proximity sensor, or other sensor or by analyzing frames captured by the image sensors. In some examples, a user may switch the panoramic camera to an alternate medium mode either using a switch on the system or by sending a remote instruction. When the panoramic camera system is in use in an alternate medium, it may modify various image processing parameters including, for example, distortion parameters, alignment parameters, gain maps, white balance, etc.

In various examples, the panoramic camera system may be configured to affix tags to images and/or videos captured while the panoramic camera system is in water or another alternate medium. For example, videos and/or images captured by the panoramic camera may be compiled into theme videos comprising multiple videos and images. When the panoramic camera captures an image or video that is in water or an alternate medium, it may tag the image and/or video accordingly. When a server incorporates the tagged image and/or video into a theme video, it may do so considering the alternate medium tag. For example, the server may group the image and/or video with other images and/or videos also captured in the alternate medium.

FIGS. 1A and 1B are cross-sectional diagrams showing one example of a panoramic camera system 1 positioned outside of an enclosure 10 and in air. FIG. 1A shows a top-down cross section of the panoramic camera system 1 while FIG. 1B shows a side cross-section. For example, FIG. 1A is a cross-sectional view taken on the plane CD, shown in FIG. 1B, while FIG. 1B is a cross-sectional view taken on the plane AB shown in FIG. 1A. Air may have a refractive index equal to one (1). The panoramic camera system 1 comprises four image sensors 4a, 4b, 4c, 4d coupled to a mounting assembly 8. The mounting assembly 8 may comprise any suitable hardware to which the image sensors 4a, 4b, 4c, 4d may be mounted, integrated, or otherwise physically coupled to. In some examples, as illustrated in FIGS. 1A, 1B, 2A and 2B, the mounting assembly 8 may be or comprise a cylindrical bracket and the image sensors 4a, 4b, 4c, 4d may be mounted radially around a perimeter of the bracket. In some examples, the mounting assembly comprises an exterior housing (that is, a plastic, metal, carbon or other fiber, and/or any other suitable material for holding and protecting the electronic equipment) with an extended handle portion 359 (FIG. 7B) extending away from the image sensors 4a, 4b, 4c, 4d. The handle portion may be grasped by a user, for example, to hold the panoramic camera system 1 during use and/or used as a stand to elevate the cameras above a table or other surface that the panoramic camera system is placed onto for recording. For example, the panoramic camera system may record a room or other environment within the fields-of-view of the image sensors.

The image sensors 4a, 4b, 4c, 4d may be coupled to the mounting assembly 8 in any suitable manner. For example, the image sensors 4a, 4b, 4c, 4d may be coupled to the mounting assembly 8 using any suitable kind of bonding, fastener, etc. Image sensors 4a, 4b, 4c, 4d may include lenses or other optics for focusing incoming electromagnetic radiation, such as visible light, onto a sensor element of the image sensors 4a, 4b, 4c, 4d. In some examples, lenses or other optics for focusing incoming electromagnetic radiation may be incorporated into the mounting assembly 8. FIG. 1A shows the in-air fields-of-view 6a, 6b, 6c, 6d of the respective image sensors 4a, 4b, 4c, 4d. As illustrated, adjacent in-air fields-of-view 6a, 6b, 6c, 6d overlap one another. For example, field-of-view 6a overlaps adjacent fields-of-view 6b and 6d. Field-of-view 6b overlaps adjacent fields-of-view 6a and 6c. Field-of-view 6d overlaps adjacent fields-of-view 6c and 6a. The fields-of-view 6a, 6b, 6c, 6d may overlap one another by at least greater than a threshold amount. The threshold amount may indicate a minimum overlap that permits the selected stitching algorithm to stitch together frames captured by the different image sensors 4a, 4b, 4c, 4d into a stitched frame. For example, some algorithms may require between 0 and 3 degrees of overlap, such as 0.7 degrees. Some example algorithms may require between 3 and 15 degrees of overlap, such as 10 degrees. In some examples, the threshold overlap may be supplemented to allow for image sensor misalignment. For example, building in a tolerance for two degrees of image sensor misalignment may be done by increasing the threshold amount by two degrees.

In FIGS. 1A and 1B, the image sensors 4a, 4b, 4c, 4d are positioned around a central axis 2 of the mounting assembly 8 and are directed perpendicular to the central axis 2. For example, an image sensor may be directed towards the center of its field-of-view (e.g., in-air field-of-view or AM field-of-view). In FIGS. 1A and 1B, a center of the respective in-air fields-of-view 6a, 6b, 6c, 6d of the image sensors 4a, 4b, 4c, 4d is substantially perpendicular to the central axis 2. Of course, in some examples, imperfections in the alignment of the image sensors 4a, 4b, 4c, 4d may cause one or more of the image sensors to deviate from a perpendicular position relative to the axis 2. Also, although all of the image sensors 4a, 4b, 4c, 4d are directed perpendicular to the central axis 2, some or all of the image sensors of the panoramic camera system 1 may be positioned in other directions. In some examples, the panoramic camera system 1 may comprise additional image sensors directed off the plane CD. In some examples, the panoramic camera system 1 may be capable of capturing images and or video over a range at or near 4π steradians.

Figure 2A:
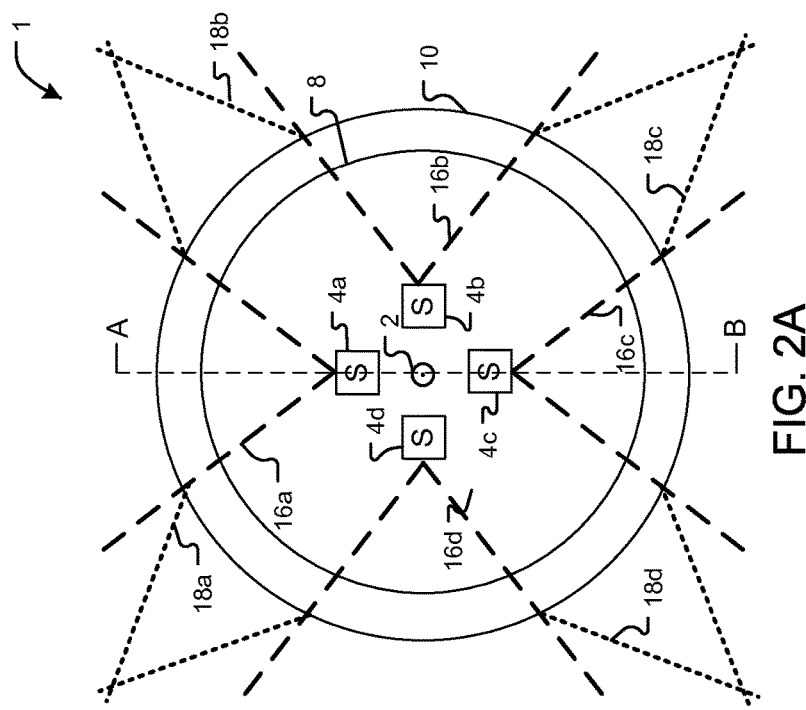

FIGS. 2A and 2B are cross-sectional diagrams showing one example of the panoramic camera system 1 of FIGS. 1A and 1B surrounded by the enclosure 10 and positioned in an alternate medium. FIG. 2B is a cross section on the plane AB, shown in FIG. 2A. FIG. 2A is a cross section taken on the plane CD. The plane CD is not shown in FIG. 2B so as to avoid obscuring the radii denoted by r and R. The plane CD, however, may be positioned similar to how it is positioned in FIG. 2B. The alternate medium may have a refractive index greater than the refractive index of air, e.g., greater than 1. Water, for example, has a refractive index of about 1.34. Because the refractive index of the alternate medium is greater than one, the effective fields-of-view of the image sensors 4a, 4b, 4c, 4c are reduced. Fields-of-view 16a, 16b, 16c, 16d shown in FIG. 2A illustrate effective fields-of-view for the image sensors 4a, 4b, 4c, 4d if the panoramic camera system 1 were to be used in the alternate medium without the enclosure 10. As illustrated, the effective fields-of-view 16a, 16b, 16c, 16d do not overlap. As a result, the panoramic camera system 1 may have unacceptable blind spots between the image sensors 4a, 4b, 4c, 4d.

The enclosure 10 may comprise a curved outer surface 20 (FIG. 2B). In some examples, the curved outer surface 20 may have a constant curvature radius, indicated in FIG. 2B by "R." The curved outer surface 20 may be positioned such that some or all of the image sensors 4a, 4b, 4c, 4d are directed towards the curved outer surface 20. For example, the curved outer surface 20 may be a figure of revolution around the central axis 2. The curved outer surface 20 may act as a lens, bending light incident on the image sensors 4a, 4b, 4c, 4d and effectively increasing their fields-of-view. For example, FIGS. 2A and 2B also illustrate alternate medium or AM fields-of-view 18a, 18b, 18c, 18d. The AM fields-of-view 18a, 18b, 18c, 18d may be the fields-of-view of the image sensors 4a, 4b, 4c, 4d when the panoramic camera system 1 is used in an alternate medium and inside the enclosure 10. For example, the panoramic camera system 1 may be submerged in the alternate medium while frames are captured. The AM fields of view 18a, 18b, 18c, 18d, as illustrated, may overlap, for example, in a manner similar to the in-air fields-of-view 6a, 6b, 6c, 6d shown in FIGS. 1A and 1B. This may allow an image processor of the panoramic camera system 1 (e.g., FIGS. 7A, 7B, and 8) to stitch frames captured from the image sensors 4a, 4b, 4c, 4d when the system 1 is in the alternate medium (e.g., underwater).

FIG. 2B shows additional example features of the panoramic camera system 1 including, of the mounting assembly 8 and the enclosure 10. As shown in FIG. 2B, the mounting assembly 8 is a figure of revolution around central axis 2. For example, the mounting assembly 8 may have a cylindrical or puck-shape. FIG. 2B shows a image sensor radius, denoted by r. The image sensor radius r is a distance between the central axis 2 and a focal point of the respective image sensors 4a, 4b, 4c, 4d (image sensor 4d is shown in FIG. 2B). In various examples, and as shown in FIGS. 2A and 2B, the enclosure 10 may be a truncated sphere having a height indicated by h. An equator 13 of the truncated sphere may be positioned at the horizontal center of the mounting assembly 8, as shown. In some examples, the height "h" may be chosen so as not to truncate the AM fields-of-view 18a, 18b, 18c, 18d of the image sensors 4a, 4b, 4c, 4d. For example, h may be greater than the spread of the effective field-of-view of the image sensors 4a, 4b, 4c, 4d at the curved outer surface 20. The enclosure 10 may also comprise one or more vertical mounting features 22 to secure the mounting assembly 8 and image sensors 4a, 4b, 4c, 4d within the enclosure. In some examples, the vertical mounting features 22 may comprise a keyed pattern that matches a corresponding keyed pattern on the mounting assembly 8. In this way, the vertical mounting features 22 may prevent the mounting assembly 8 from rotating or sliding within the enclosure 10.

Figure 3:
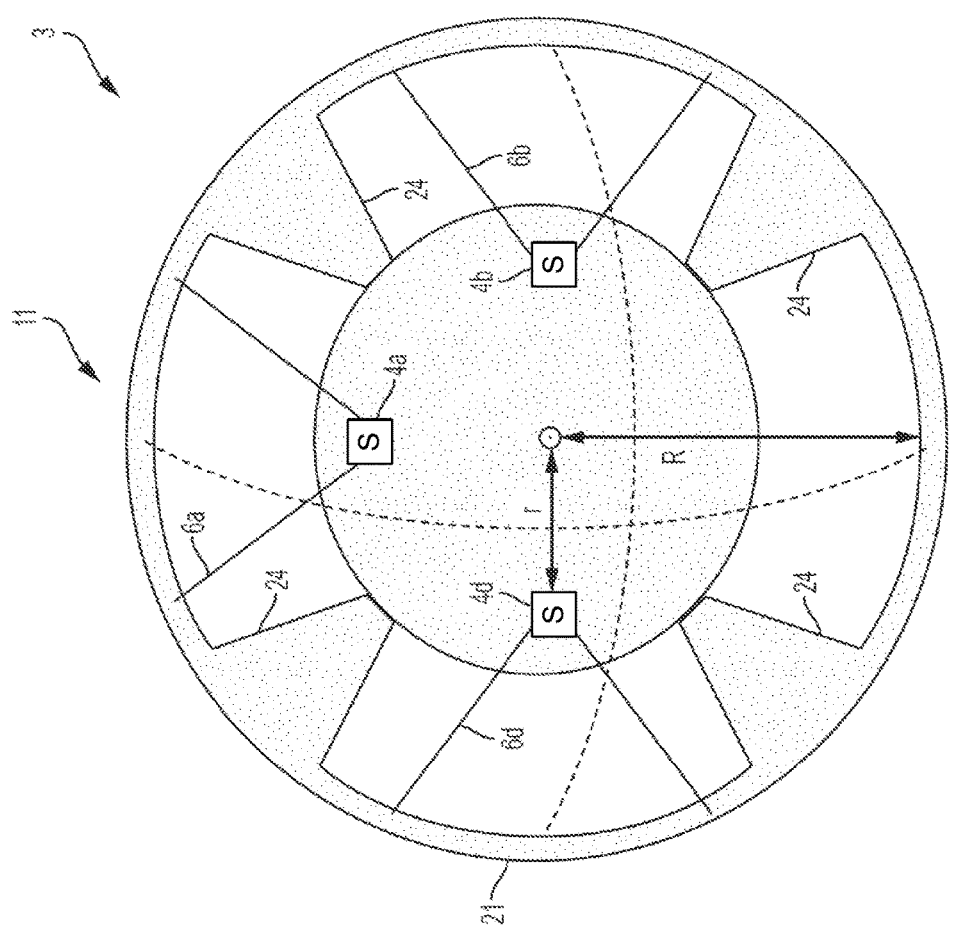
FIG. 3 is a cross-sectional diagram showing another example of a panoramic camera system having a spherical enclosure.

FIG. 3 is a cross-sectional diagram showing another example of a panoramic camera system 3 having a spherical enclosure 11. For example, instead of being truncated with a height h, the spherical enclosure 11 is a sphere having a radius of R, as illustrated. Accordingly, the curved outer surface 21 of the spherical enclosure 11 may be exterior of the spherical enclosure 11. FIG. 3 also shows radial mounting features 24 extending from the curved outer surface 20 of the spherical enclosure 11 and contacting the mounting assembly 8. Similar to the vertical mounting features 22, the radial mounting features 24 may be keyed with corresponding patters on the mounting assembly 8 so as to prevent rotation or sliding of the mounting assembly 8 within the spherical enclosure 11. Also, although radial mounting features 24 are shown with respect to the spherical enclosure 11, other enclosures, such as the truncated sphere enclosure 10 described herein, may have similar radial mounting features 24.

Figure 4:
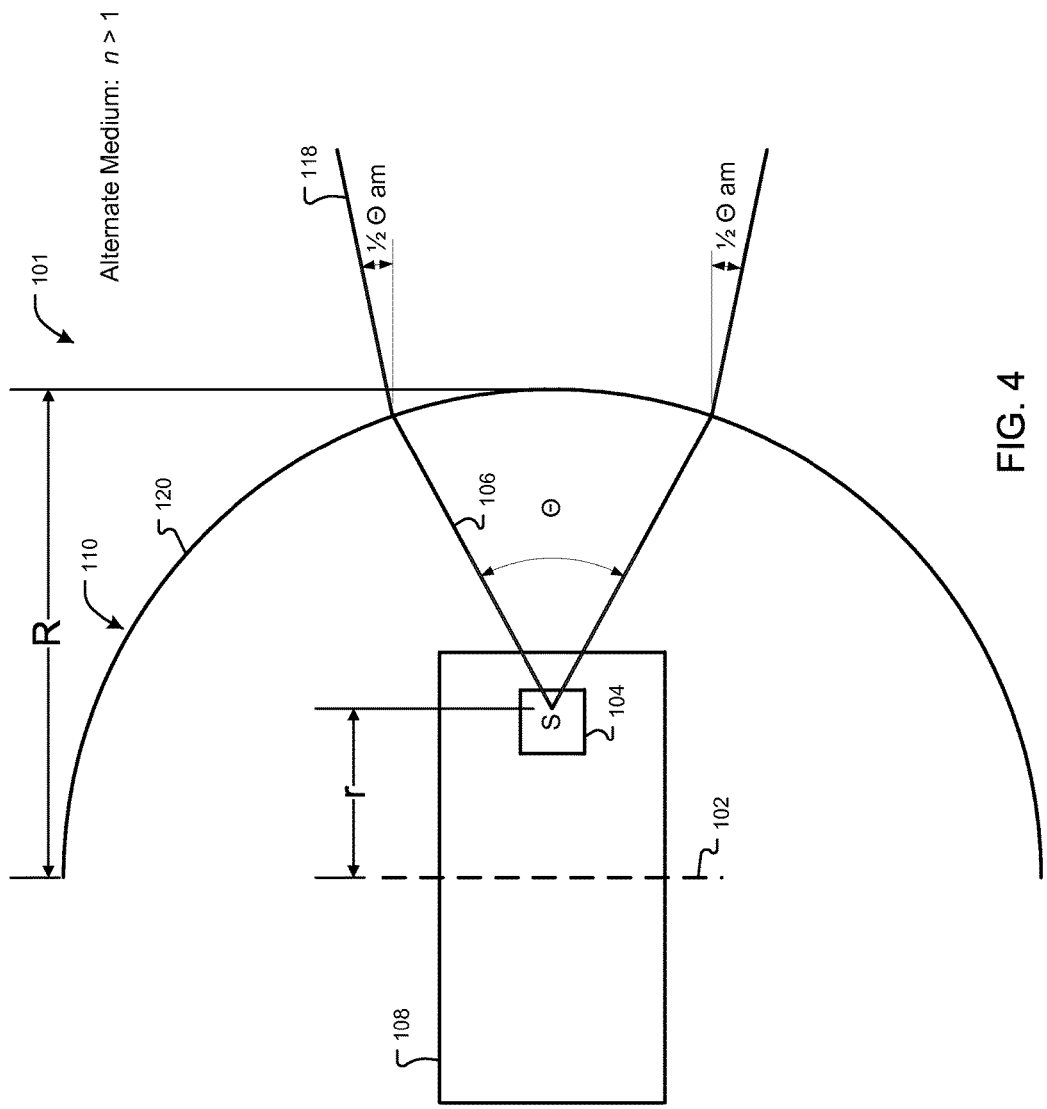
FIG. 4 is a diagram showing one example of the panoramic camera system and illustrating the optical effect of the curved outer surface of the enclosure.

FIG. 4 is a diagram showing one example of a panoramic camera system 101 and illustrating the optical effect of a curved outer surface 120 of an enclosure 110. The curved outer surface 120 is illustrated in FIG. 4 as a semi-circle. In various examples, however, the enclosure 110 may have curved outer surfaces of various sizes and configurations including, for example, a truncated surface 20 as shown in FIG. 2B and a spherical surface 21 as shown in FIG. 3. In FIG. 4, an image sensor 104 is shown coupled to a mounting assembly 108. The image sensor 104 has an in-air field-of-view 106, also indicated by θ, describing the effective field-of-view of the image sensor 104 between the focal point of the image sensor 104 and the curved outer surface 120. For example, the area between the focal point of the image sensor 104 and the curved outer surface 120 may be filled with air. In some examples, the area between the focal point of the image sensor 104 and the curved outer surface 120 may be filled with another material, such as, for example, an optical coupling fluid having a refractive index greater than that of air. In these examples, the effective field-of-view of the image sensor 104 between the focal point of the image sensor 104 and the curved outer surface 120 may be less than the in-air field-of-view 106. The AM field-of-view 118 of the image sensor 104 is also indicated in FIG. 4 by $\theta_{am}$.

In various examples, the AM field-of-view 118 of the image sensor 104 may be given by Equation (1) below:

$$\theta_{am} = 2\theta + 2\arcsin\left(\frac{n_{air}}{n_{am}} \times \frac{r}{R}\sin\left(\pi - \frac{\theta}{2}\right)\right) - 2\arcsin\left(\frac{r}{R}\sin\left(\pi - \frac{\theta}{2}\right)\right) \quad (1)$$

In Equation (1), $\theta_{am}$ is the alternate media (AM) field-of-view 118 of the image sensor 104, θ is the in-air field-of-view 6e of the image sensor 104. The quantity $n_{air}$ is the refractive index of air, usually equal to 1. The quantity $n_{am}$ is the refractive index of the alternate medium. For example, if the alternate medium is water, $n_{am}$ may be equal to about 1.34. The quantity "r" is the radius from the central axis 2 to the focal point of the image sensor 104. The quantity "R" is the curvature radius of the curved outer surface 120.

Figure 5:
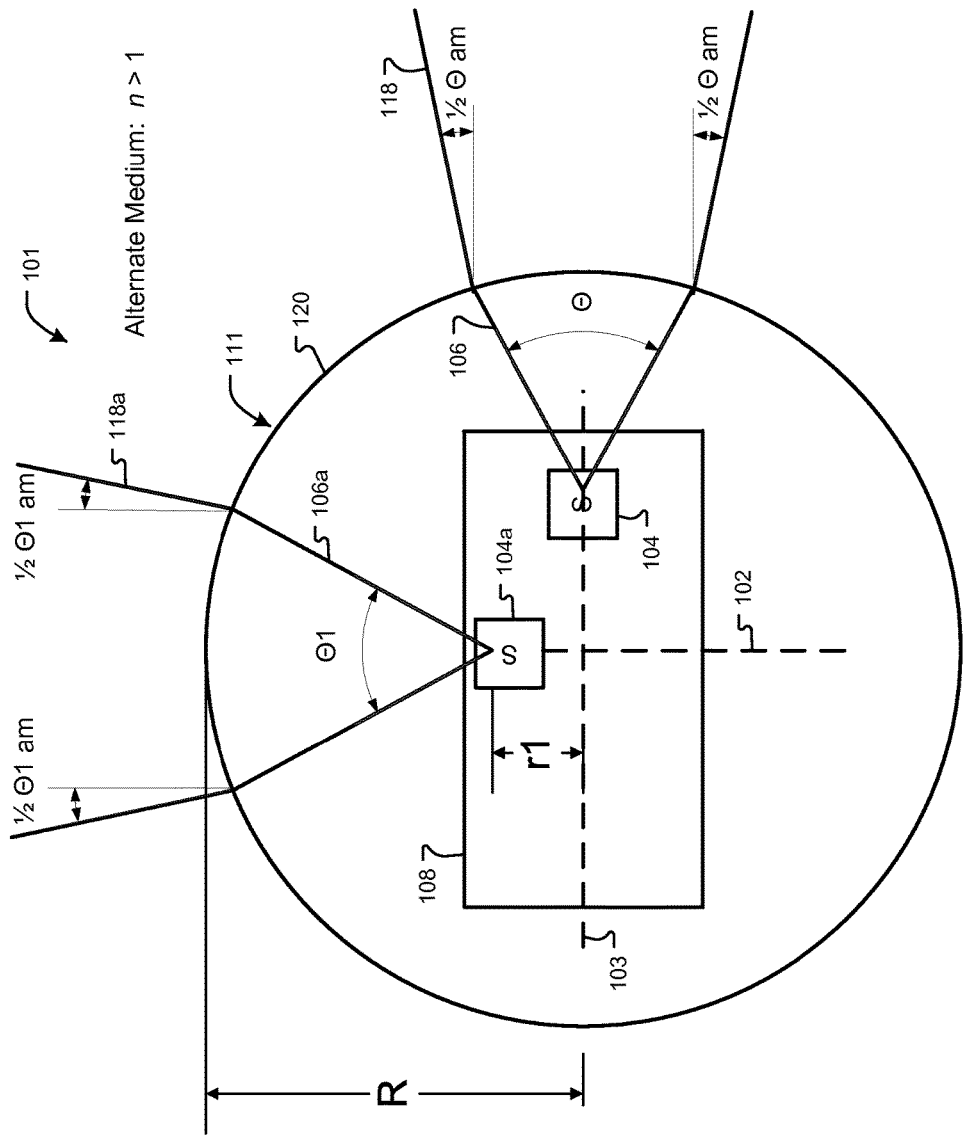
FIG. 5 is a diagram showing one example of the panoramic camera system having a spherical enclosure.

FIG. 5 is a diagram showing one example of the panoramic camera system 101 having a spherical enclosure 111. The panoramic camera system 1 shown in FIG. 5 comprises the image sensor 104 and an additional image sensor 104a. The image sensor 104a is directed parallel to the central axis 102, although it may be directed in any direction not perpendicular to the central axis 102. The image sensor 104a has an in-air field-of-view θ1, indicated by 106a, and an AM field-of-view θ1$_{am}$, indicated by 118a. The AM field-of-view θ for the image sensor 104 may be given by Equation (1) above. The AM field-of-view θ1$_{am}$ for the image sensor 104a may be given by Equation (2) below:

$$\theta 1_{am} = 2\theta + 2\arcsin\left(\frac{n_{air}}{n_{am}} \times \frac{r1}{R}\sin\left(\pi - \frac{\theta 1}{2}\right)\right) - 2\arcsin\left(\frac{r1}{R}\sin\left(\pi - \frac{\theta 1}{2}\right)\right) \quad (2)$$

In Equation (2), θ1$_{am}$ is the alternate media (AM) field-of-view 118a of the image sensor 104a, θ is the in-air field-of-view 106a of the image sensor 104a. The quantity n$_{air}$ is the refractive index of air. The quantity n$_{am}$ is the refractive index of the alternate medium, while "r1" is the radius from a orthogonal axis 103 of the mounting assembly 108 to a focal point of the image sensor 104a. The orthogonal axis 103 may be orthogonal to the central axis 2. For example, when the orthogonal axis 103 may be in a plane intersecting an equator of the curved outer surface 120. The quantity "R" is the curvature radius of the curved outer surface 120.

Figure 6A:
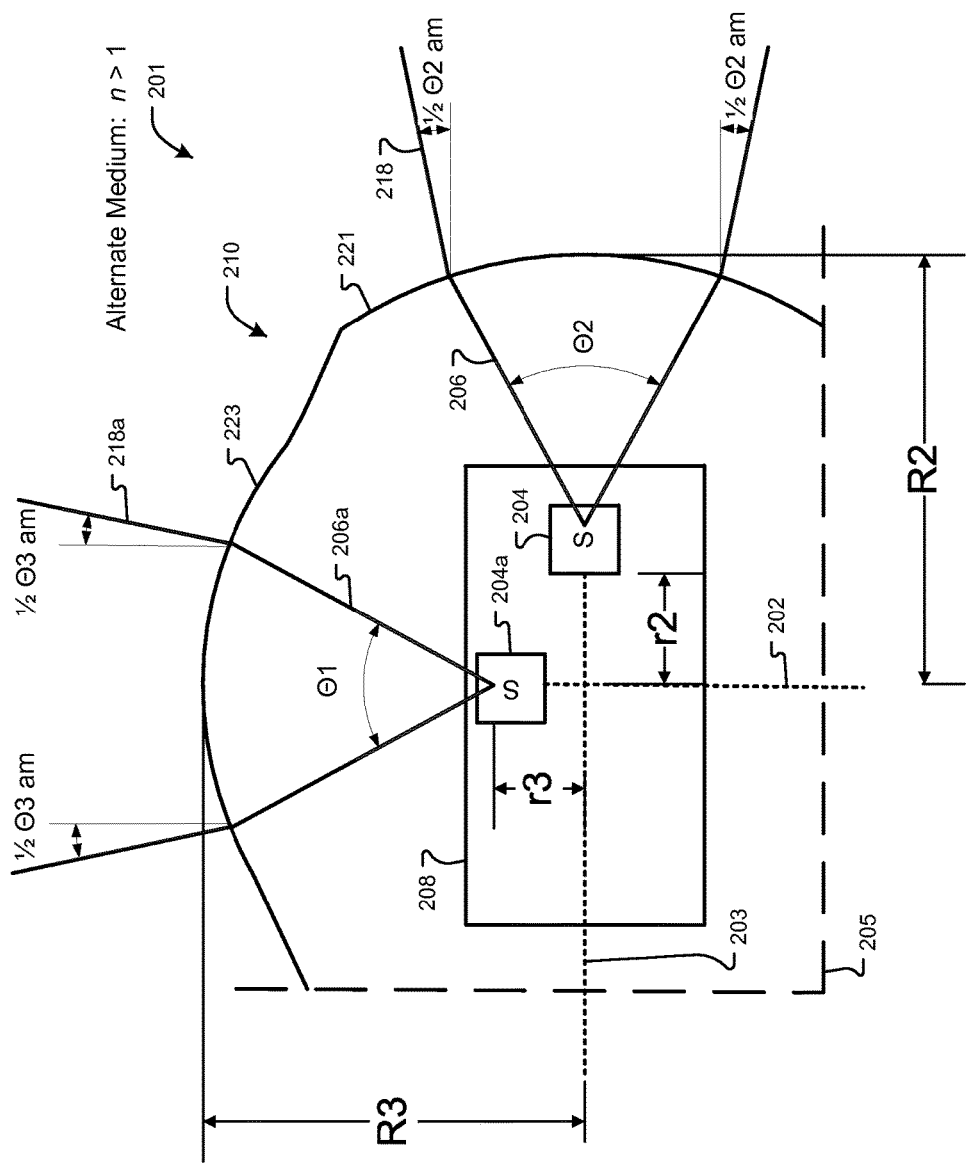
FIG. 6A is a diagram showing one example of a panoramic camera system with an enclosure comprising two curved outer surfaces.

In some examples, the enclosure may have multiple curved outer surfaces having different radii. For example, FIG. 6A is a diagram showing one example of a panoramic camera system 201 with an enclosure 210 comprising two curved outer surfaces 221 and 223 having different radii, R2 and R3. FIG. 6A shows a partial view of the panoramic camera system 201. For example, additional image sensors and/or surfaces (not shown) may be positioned outside the broken lines 205. Also, additional image sensor systems (not shown) may be positioned inside the broken line 205, for example, as illustrated below in FIG. 6B. In FIG. 6A, image sensor 204 is directed towards curved outer surface 221. The AM field-of-view of the image sensor 204 may be given by Equation (3) below:

$$\theta 2_{am} = \quad (3)$$
$$2\theta 2 + 2\arcsin\left(\frac{n_{air}}{n_{am}} \times \frac{r2}{R2}\sin\left(\pi - \frac{\theta 2}{2}\right)\right) - 2\arcsin\left(\frac{r2}{R2}\sin\left(\pi - \frac{\theta 2}{2}\right)\right)$$

In Equation (3), θ2$_{am}$ is the alternate media (AM) field-of-view 218 of the image sensor 204, θ2 is the in-air field-of-view 206 of the image sensor 204. The quantity n$_{air}$ is the refractive index of air, while n$_{am}$ is the refractive index of the alternate medium. The quantity "r2" is the radius from a central axis 202 of the mounting assembly 208 to a focal point of the image sensor 204. The quantity "R2" is the curvature radius of the curved outer surface 221.

The AM field-of-view of the image sensor 204a may be given by Equation (4) below:

$$\theta 3_{am} = \quad (4)$$
$$2\theta 3 + 2\arcsin\left(\frac{n_{air}}{n_{am}} \times \frac{r3}{R3}\sin\left(\pi - \frac{\theta 3}{2}\right)\right) - 2\arcsin\left(\frac{r3}{R3}\sin\left(\pi - \frac{\theta 3}{2}\right)\right)$$

In Equation (4), θ3$_{am}$ is the alternate media (AM) field-of-view 218a of the image sensor 204a, 0 is the in-air field-of-view 206a of the image sensor 204a. The quantity n$_{air}$ is the refractive index of air, while n$_{am}$ is the refractive index of the alternate medium. The quantity "r3" is the radius from a horizontal axis 203 of the mounting assembly 208 to a focal point of the image sensor 204a. The quantity "R3" is the curvature radius of the curved outer surface 120. The panoramic camera system 201 may utilize the enclosure 210 with different curved outer surfaces 221, 223 for various reasons. For example, the image sensor 204 may have a different in-air field-of-view than the image sensor 204a, thus calling for a different level of correction in the alternate medium.

Figure 6B:
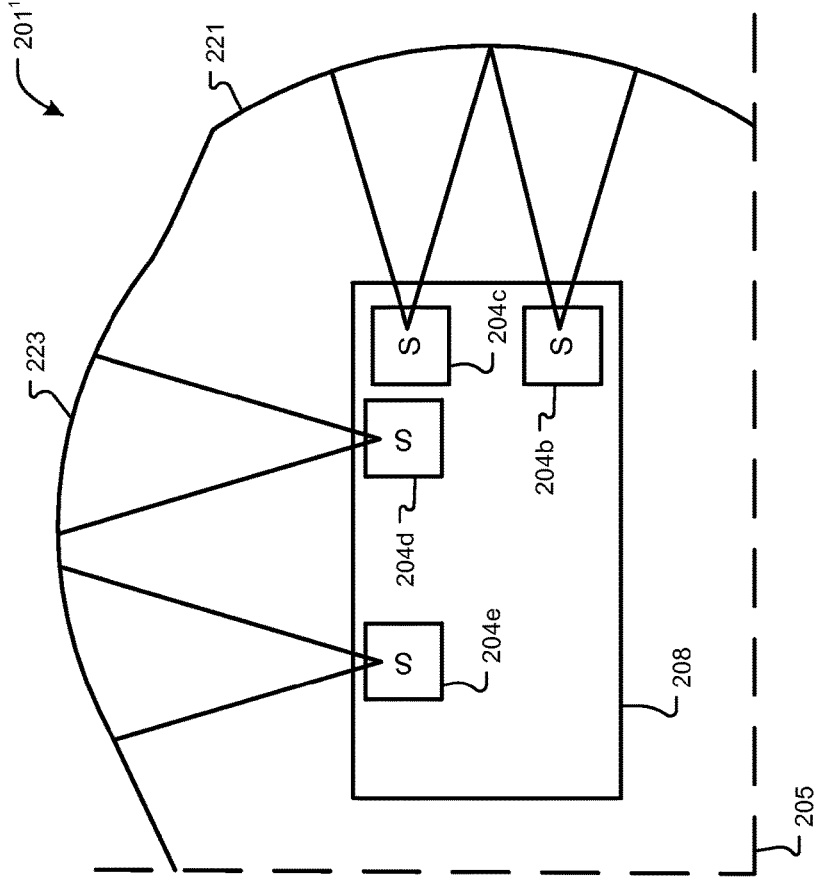
FIG. 6B shows one example of a panoramic camera system comprising image sensor directed towards different curved outer surfaces.

Although FIG. 6A shows only one image sensor directed at each of the curved outer surfaces 223, 221, some examples, may include multiple image sensors directed at each surface. For example, FIG. 6B shows one example of a panoramic camera system 201' comprising image sensors 204b, 204c, 204d and 204e. FIG. 6B is also a partial view of the panoramic camera system 201'. The panoramic camera system 201' may include additional components including, for example, additional components positioned outside of the broken lines 205. In FIG. 6B, Image Sensors 204b and 204d are directed towards the curved outer surface 221 while image sensors 204e and 204d are directed towards the curved outer surface 223. The AM fields-of-view of the image sensors 204b, 204c directed towards the curved outer surface 221 may be found, for example, according to equation (3) while the AM fields-of-view of the image sensors 204d, 204e may be found, for example, according to equation (4). In some examples, image sensors that are directed to a curved outer surface or surfaces having a common curvature radius may have a common in-air field-of-view. Also, for example, image sensors that are directed towards curved outer surfaces having different curvature radii may have different in-air fields-of-view. For example, curved outer surfaces of different radii, as shown in FIGS. 6A and 6B, may be used to account for different image sensors having different in-air fields-of-view.

As illustrated by Equations (1)-(4), when the ratio of r/R increases, the AM fields-of-view of the image sensors also increase. The AM fields-of-view of the respective image sensors may be selected, for example, by varying the radius of the curved outer surface or surfaces. The radius of the curved outer surface(s) may be selected so that the AM fields-of-view of adjacent image sensors overlap to facilitate stitching. For example, the radius of the curved outer surface(s) may be selected so that the AM fields-of-view of adjacent image sensors overlap by greater than the threshold amount described herein.

As described above, in some examples, a medium other than air may be present between the respective image sensors 104, 104a, 204, 204a and associated curved outer surfaces, 120, 221, 223. In those cases, Equations (1)-(4) may be used, however, θ, θ1, θ2, and θ3, may be the effective fields-of-view of the image sensors behind the curved outer surfaces (i.e., the fields-of-view in the medium other than air). Also, n$_{air}$ may be replaced by the refractive index of the medium between the image sensors and curved outer surfaces.

Figure 7A:
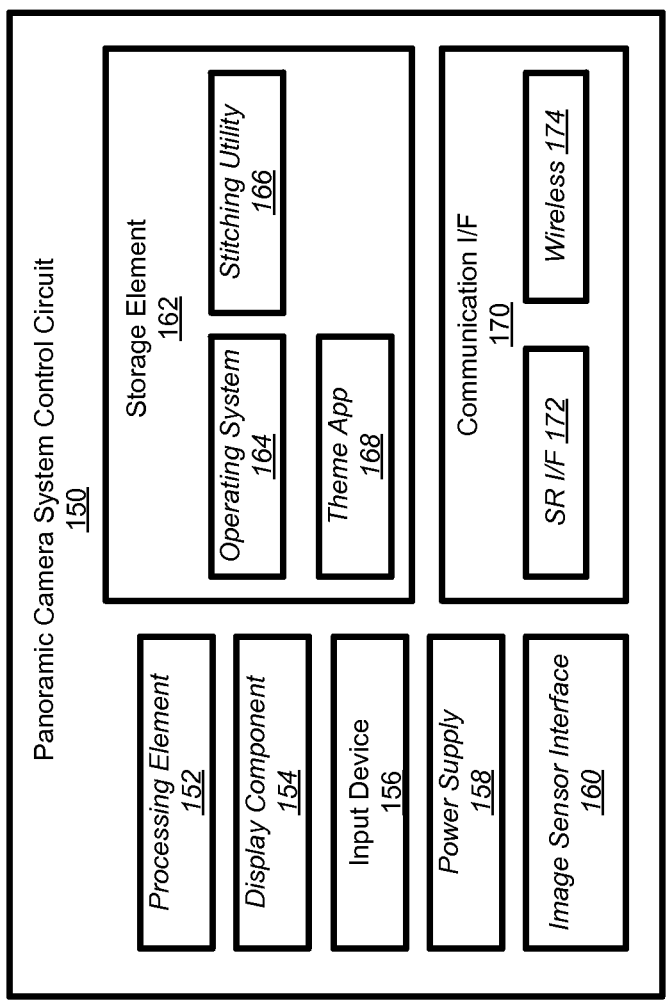
FIG. 7A is a block diagram showing one example of a control circuit for a panoramic camera system.

FIG. 7A is a block diagram showing one example of a control circuit 150 for a panoramic camera system. The control circuit 150 may be utilized with any of the panoramic camera systems described herein and may be incorporated into the panoramic camera system in any suitable manner. In some examples, the control circuit 150 may be coupled to a mounting assembly or, for example, may be coupled to the mounting assembly or other suitable component as described below in FIG. 7B. The control circuit 150 may include one or more processing elements 152 for executing instructions and retrieving data stored in a storage element 162. The processing element 152 may comprise at least one processor. Any suitable processor or processors may be used. For example, the processing element 152 may comprise one or more digital signal processors (DSPs). The storage element 162 can include one or more different types of memory, data storage or computer readable storage media devoted to different purposes within the control circuit 150. For example, the storage element 162 may comprise flash memory, random access memory, disk-based storage, etc. Different portions of the storage element 162, for example, may be used for program instructions for execution by the processing element 152, storage of images or other digital works, and/or a removable storage for transferring data to other devices, etc. In some examples, the processing element 152 and/or the processing element 152 in conjunction with the stitching utility 166 are referred to herein as an image processor.

The storage element 162 may also store software for execution by the processing element 152, such as an operating system 164. In some examples, the storage element 162 may store a stitching utility 166 that may be utilized, as described herein, to stitch frames from the image sensors into panoramic images and/or video. A theme application 168 may also be stored at the storage element 162. When executed by the processing element 152, the theme application 168 may determine when the panoramic camera system is used with the disclosed enclosure and tag images and/or video captured while the enclosure is in place to indicate that the images and/or video where captured in water or another alternate medium.

The control circuit 150 may also comprise a display component 154. The display component 154 may be mounted on an exterior of the panoramic camera system (e.g., visible to users). In some examples, the display component 154 may comprise one or more light emitting diodes (LEDs) or other suitable display lamps. Also, in some examples, the display component may comprise, for example, one or more devices such as cathode ray tubes (CRTs), liquid crystal display (LCD) screens, gas plasma-based flat panel displays, LCD projectors, or other types of display devices, etc.

The control circuit 150 may also include one or more input devices 156 operable to receive inputs from a user. The input devices 156 can include, for example, a push button, touch pad, touch screen, wheel, joystick, keyboard, mouse, trackball, keypad, accelerometer, light gun, game controller, or any other such device or element whereby a user can provide inputs to the control circuit 150. These input devices 156 may be incorporated into the control circuit 150 or operably coupled to the control circuit 150 via wired or wireless interface. For example, input devices 156 may include a sensor or switch 9 (FIG. 2B) for detecting the presence of the disclosed enclosure. For control circuits 150 with touch sensitive displays, the input devices 156 can include a touch sensor that operates in conjunction with the display component 154 to permit users to interact with the image displayed by the display component 154 using touch inputs (e.g., with a finger or stylus). The control circuit 150 may also include a power supply 158, such as a wired alternating current (AC) converter, a rechargeable battery operable to be recharged through conventional plug-in approaches, or through other approaches such as capacitive or inductive charging. The control circuit 150 may also include one or more image sensor interfaces 160. Image sensor interfaces 160 may be configured to receive data from one or more image sensor, where the received data indicates a frame captured by the image sensor. The image sensor interfaces 160 may convert the received data into a format that is readable, for example, by the stitching utility 166.

The control circuit 150 may also include a communication interface 170, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. Examples of wireless components in the communications interface 170 include, for example, a wireless module 174 configured to communicate utilizing IEEE 802.11 or another suitable wireless local area network (LAN) protocol. A short range interface 172 may be configured to communicate using one or more short range wireless protocols such as, for example, near field communications (NFC), Bluetooth™, Bluetooth LE™, etc. It should be understood that the control circuit 150 may also include one or more wired communications interfaces for coupling and communicating with other devices.

Figure 7B:
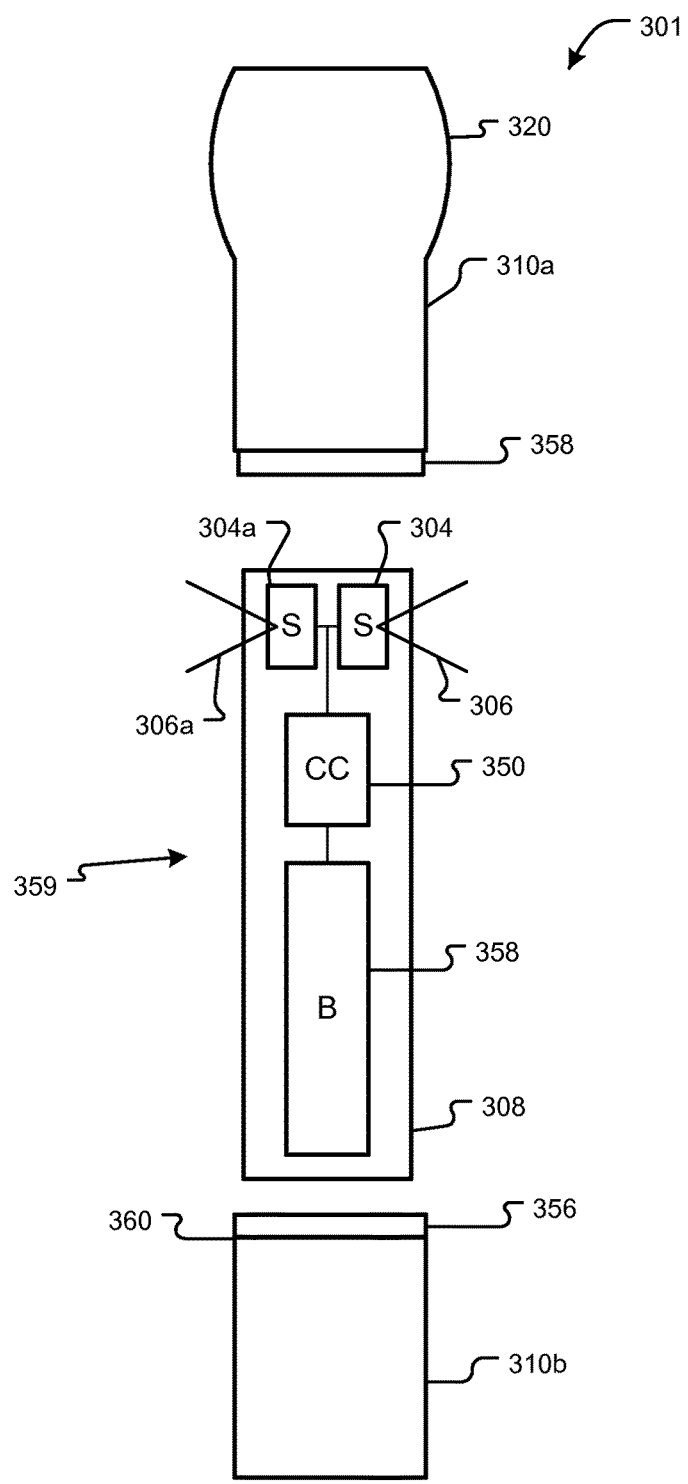
FIG. 7B is a diagram showing another example of a panoramic camera system including an enclosure comprising a first half and a second half.

FIG. 7B is a diagram showing another example of a panoramic camera system 301 including an enclosure 310 comprising a first portion 310a and a second portion 310b. A mounting assembly 308 incorporates image sensors 304 and 304a having in-air fields-of-view 306, 306a. The mounting assembly 308 also comprises a control circuit 350 and a power supply or battery unit 352. The control circuit 150 described above in conjunction with FIG. 7A is one example for implementing the control circuit 350. The battery unit 352 may provide power to the various other components of the panoramic camera system 301. The enclosure 310 may be configured to be secured over the mounting assembly 308. For example, when the enclosure 310 is in place, image sensors 304, 304a may be directed towards the respective curved outer surface 320. The enclosure 310 may be secured over the mounting assembly 308 in any suitable manner. For example, enclosure portion 310a may comprise a threaded portion 358 while enclosure portion 310b comprises a threaded portion 356. A user may slide the enclosure portions 310a, 310b over the mounting assembly 308 and screw the threaded portions 358, 354 together to secure the enclosure 310 over the mounting assembly 308. In some examples, a gasket 360 made of rubber or another suitable material may be placed between the enclosure portions 310a, 310b to keep water away from the mounting assembly 308 and image sensors 304, 304a.

Figure 8:
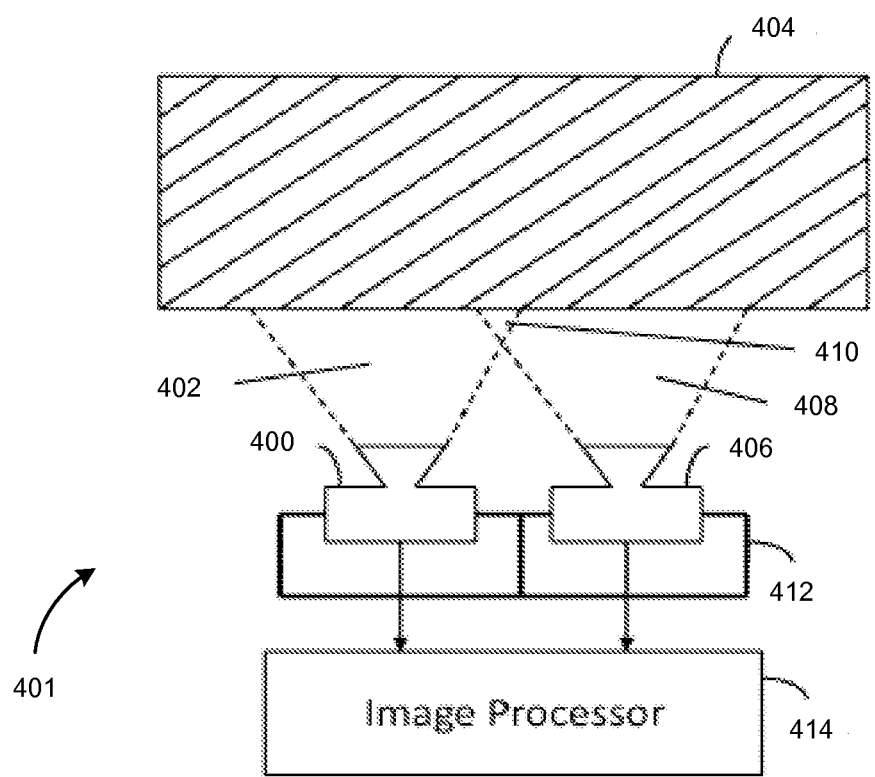
FIG. 8 is a diagram demonstrating one example of a calibration set up that may be used to stitch frames from a panoramic camera system.

FIG. 8 is a diagram demonstrating one example of a calibration set up that may be used to stitch frames from a panoramic camera system. A panoramic camera system 401 comprises example image sensors 400, 406, a mounting assembly 412 and an image processor 414. For example, the image processor 414 may include the processing element 152 executing the stitching utility 166, described herein. Image sensor 400 has an effective field-of-view 402, while image sensor 406 has an effective field-of-view 408. The effective fields-of-view 402, 408 may be in-air or alternate medium fields-of-view, for example, depending on whether the panoramic camera system 401 is used in air or an alternate medium (e.g., in conjunction with the enclosures described herein).

The effective fields-of-view 402, 408 have an overlap 410. The image sensors 400, 406 may have fixed positions on the mounting assembly 412. The image sensors 400, 406 may have fixed positions other than those shown in FIG. 8. For example, the image sensors may have the fixed positions illustrated in any of the figures herein or any other suitable position. The image sensors 400, 406 may capture image data and provide the image data to the image processor 414. The image processor 414 may be or comprise any suitable type of computing device comprising a central processor, a graphics processing unit and/or another type of processor.

The image processor 414 may be programmed to utilize still frames captured by the image sensors 400, 406 to determine distortion parameters and/or alignment parameters, such as the overlap 410. For example, the image sensors 400, 406 may capture calibration frames showing a standardized calibration fixture 404 from the first and second image sensors 400, 406. The calibration fixture 404 may be any object having thereon a test pattern that allows the image processor 414 to determine the level of overlap 410 at the pixel level. For example, the calibration fixture 404 may comprise a block, a plate, a cylinder, etc. made from plastic, wood, metal or any other suitable material. The test pattern may be affixed to the calibration fixture 404 in any suitable manner. For example, the test pattern may be painted, printed, etc. In some examples, the test pattern may be printed on a decal that is bonded to the calibration fixture. In addition, the calibration fixture 404 may enable the image processor 414 to accommodate any vertical, horizontal, or rotational misalignment of the image sensors 400, 406 as well as any focus errors or areas of soft focus for each image sensor 400, 406 so that the image correction processing can be applied.

In various examples, the test pattern of the calibration fixture 404 includes straight lines. For example, the test pattern may comprise a set of diagonal lines, as illustrated in FIG. 8, or may be in the form of a grid. The image processor 414 may review frames showing the test pattern captured by various image sensors 400, 406. In various examples, the effective field-of-view 402, 408 of one or both of the image sensors 400, 406 may have areas of distortion, for example, due to a lens in the optical system (e.g., a lens associated with the image sensor 400, 406 and/or the curved outer surface of an enclosure described herein), or due to some other irregularity in the system. To produce an output image and/or video stream from both image sensors 400, 406, it may be desirable to minimize or eliminate non-uniform distortion, for example, along the edges where input streams are joined. For example, frames of the calibration fixture 404 captured by the image sensors 400, 406 may be analyzed by the image processor 414 to generate an indication of distortions for points in an image plane corresponding to teach of the image sensors 400, 406. The image processor may derive distortion parameters for the various image sensors 400, 406, for example, by observing the curvature of the straight lines of the test pattern as depicted in the frames. For example, distortion parameters may correct for curvature in the straight lines of the test pattern as depicted in frames from the image sensors 400, 406. The image processor 414 may apply corrections to the distortions in order to generate stitched images and/or video with minimal distortions between image sensor feeds.

The test pattern of the calibration fixture 404 may, in some examples, comprise a color chart and/or uniform gray chart. For example, these charts may allow the image processor 414 to analyze potential differences in color accuracy, relative illumination, and relative uniformity between image sensors 400, 406. Differences may be stored as correction factors and may be utilized by the image processor 414 in the stitching process to reduce noticeable differences between image streams. The calibration process may allow for a stitched frame to be stitched from multiple frames received from the image sensors with the viewer being unable to perceive any meaningful change in image quality through the entire stitched frame. The stitched frame may be a stand-alone image or may be part of a panoramic video.

Figure 9:
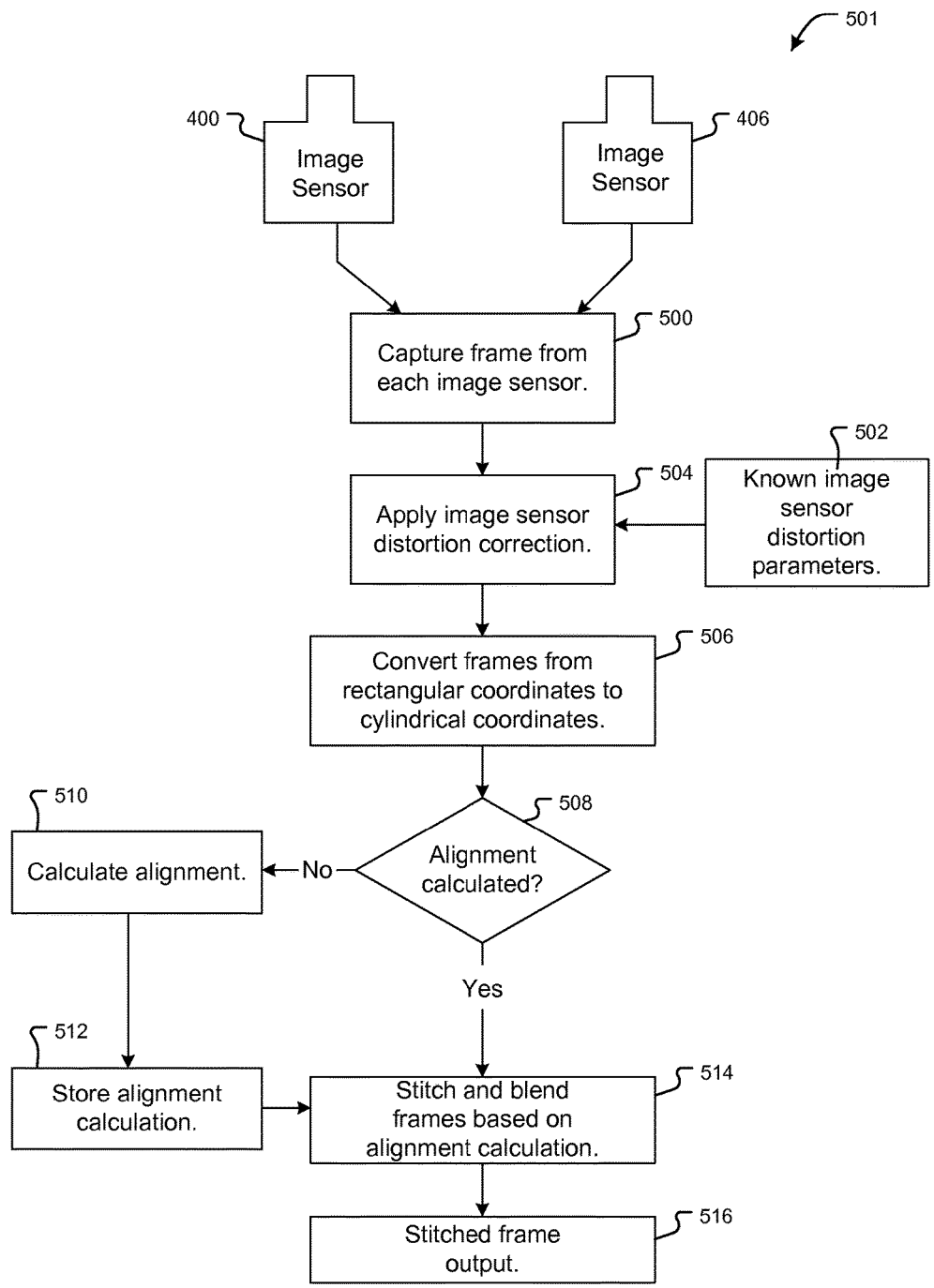
FIG. 9 is a workflow showing one example of a process for stitching images from image sensors of a panoramic camera system.

FIG. 9 is a workflow 501 showing one example of a process for stitching frames from image sensors of a panoramic camera system. The workflow 501 is described in the context of the panoramic camera system 401 of FIG. 8, although it may be used with any of the panoramic camera systems described herein. At 500, the image processor 414 may capture frames from the image sensor 400 and the image sensor 406 (e.g., simultaneously). The frames may be still images and/or part of a video. Stored camera or image sensor distortion parameters 502 may be applied by the image processor at 504. For example, the image sensor distortion parameters may be based on frames showing the calibration fixture 404, as described herein. Optionally, at 506, the image processor 414 may convert the frames to cylindrical coordinates. For example, frames captured by the image sensors 400, 406 may be initially configured according to the lens or lenses used with the image sensors 400, 406. For example, if a fisheye lens is used, incoming frames may be arranged according to a fisheye coordinate system where each point in the frame had a viewing angle proportional to its distance from the center of the frame. Converting the frames to cylindrical coordinates may facilitate the stitching process by allowing the image processor to align the extremities of the frames.

At 508, the image processor may determine whether an alignment has been calculated. If not, an alignment between the image sensors 400, 406 may be found at 510 and stored at 512. (See FIG. 6) The image processor 414 may proceed to 514. If an alignment between the image sensors 400, 406 has already been found at 508, the image processor 414 may also proceed to 514 where it may stitch the frames, blending the images based on the stored alignment calculation. Stitching at 514 may be performed in any suitable manner. In some examples, the image processor 414 may apply an alpha blending method. According to an alpha blending method, the image processor 414 may average redundant pixels from adjacent frames. Different stitching algorithms may provide best results with different levels of overlap between adjacent frames, as described herein. The result of the stitching at 514 may be a stitched frame, output at 516. The stitched frame may be a stand-alone image or part of a video. Although the workflow 501 is described with respect to two image sensors 400, 406, it may be used to stitch any suitable number of frames from any suitable number of image sensors.

Camera distortion and alignment parameters used in the workflow 501 may be found utilizing a calibration process, for example, as described above with respect to FIG. 8. Example image sensor distortion parameters include a lens distortion parameter and a image sensor field-of-view (FOV) parameter, which may be found for each image sensor of a panoramic camera system. Example alignment parameters include offsets between each image sensor that may be used to determine the overlap between the images generated by the image sensors (e.g., 410 in FIG. 8).

Figure 10:
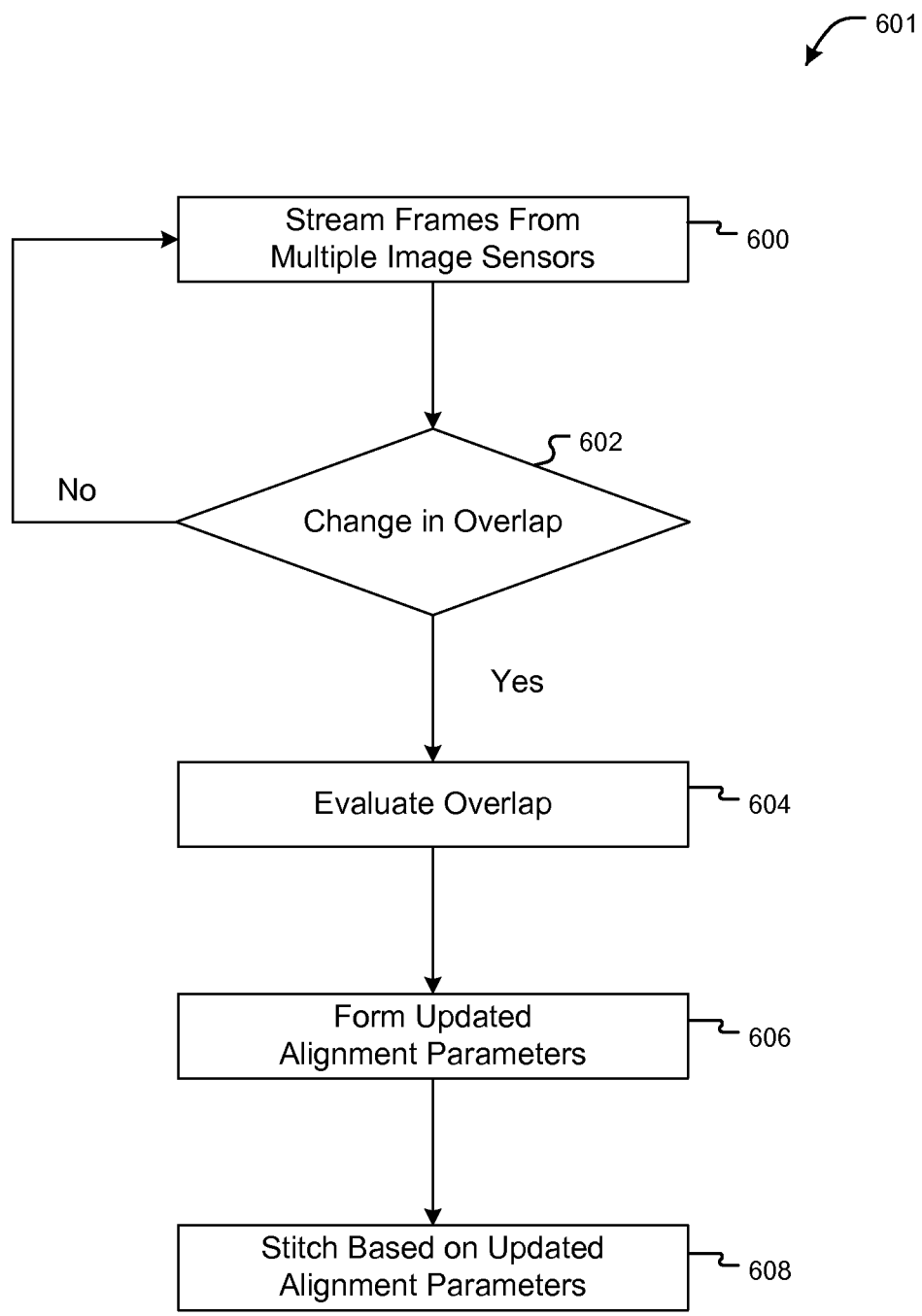
FIG. 10 is a flow chart showing one example of a process flow for recalculating an alignment parameter for two image sensors, for example, after an initial alignment and calibration.

In some examples, a panoramic camera system may use automated processing techniques to determine the overlap between two frames (e.g., overlap 410 illustrate din FIG. 8). For example, feature matching and homography calculations may be used. In one example, a manual alignment may be used to manually position image frames in a stitched frame until the overlapping regions are seamless. For example, FIG. 10 is a flow chart showing one example of a process flow 601 for recalculating an alignment parameter for two image sensors, for example, after an initial alignment and calibration. The process flow 601 may be executed by the image processor 414. At 600, the image processor 414 may receive one or more frames from multiple image sensors (e.g., image sensors 400 and 406). At 602, the image processor 414 may check the received video for a change in frame or image overlap between frames received from adjacent image sensors. A change in overlap regions may result due to a change in image sensor alignment and/or a change in the surrounding medium. For example, when a panoramic camera system is placed in the disclosed enclosure and immersed in water or another alternate medium, the overlap between adjacent images may change. If no change in overlap is detected, the image processor 414 may continue to stitch feeds from the image sensors according to the original alignment parameters.

If a change in overlap is detected, the image processor 414 may evaluate the overlap change at 604. For example, the image processor 414 may evaluate a displacement between matching pixels of images or frames from adjacent image sensors. In some examples, if the change in overlap is due to motion of one of the image sensors, sensors such as accelerometers and/or digital gyroscopes may be used to detect a change in the position of one or more image sensors. Updated alignment parameters may be formed at 606. For example, the image processor 414 may evaluate images or frames from adjacent image sensors and identify duplicate pixels. At 608, the image processor may stitch received frames using the updated alignment parameters at 608.

In some examples, panoramic camera systems, such as those described herein, may be configured to operate on raw image sensor outputs. For example, many image sensors have an onboard image signal processor (ISP) that control settings for image properties such as, for example, white balance, color accuracy, color consistency, exposure consistency, etc. A panoramic camera system configured to operate on raw image sensor outputs may have a single image signal processor or image processor that receives raw outputs from the various image sensors and applies common image properties to frames from some or all of the image sensors.

Figure 11A:
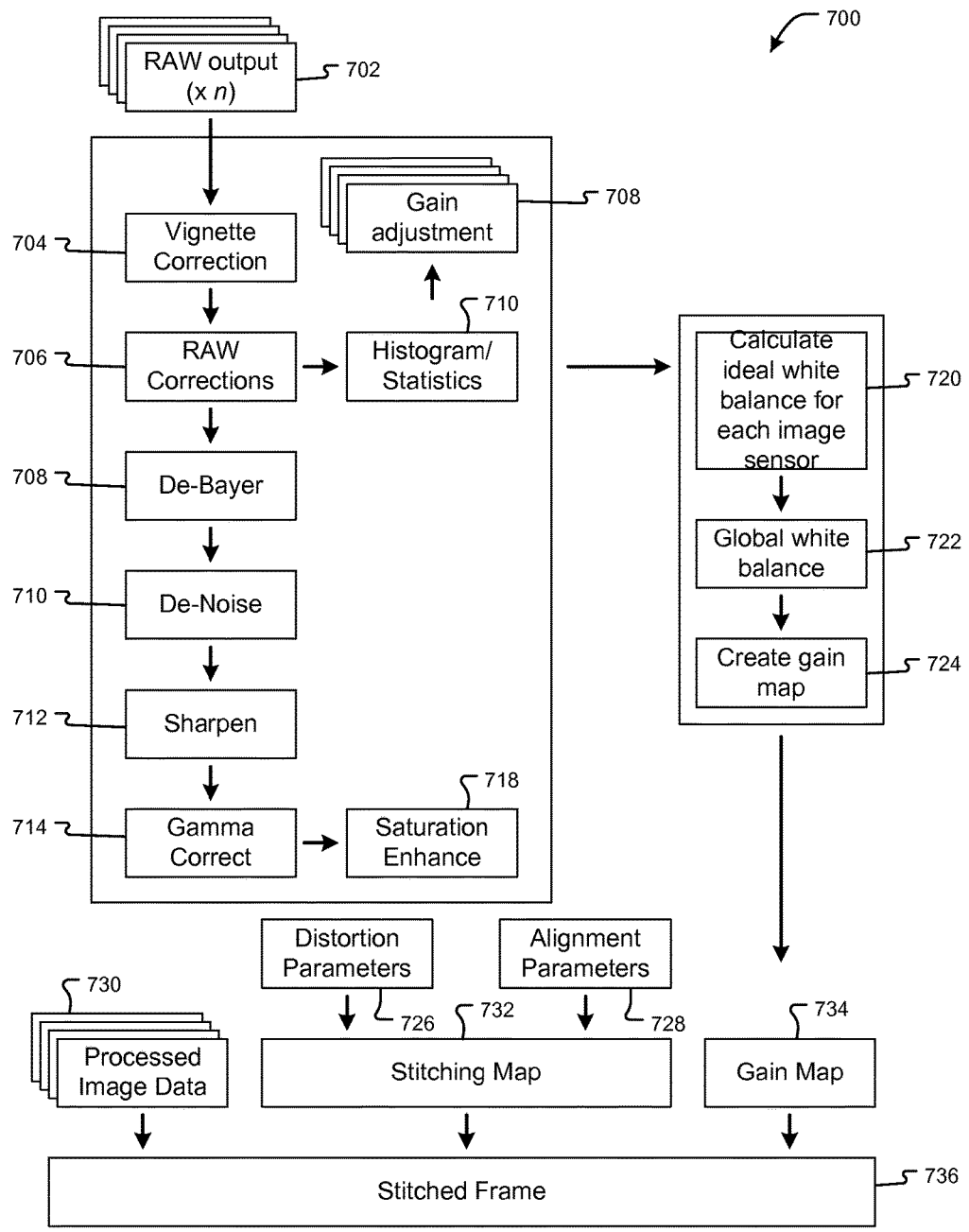
FIG. 11A is a workflow showing an example process for processing and stitching frames from image sensors in a panoramic camera system utilizing raw image processing.

FIG. 11A is a workflow 700 showing an example process for processing and stitching frames from image sensors in a panoramic camera system utilizing raw image processing. The image processor (e.g., the processing element 152 executing the stitching utility 166) may receive raw output data 702 from some or all of the image sensors in a panoramic camera system. The raw output data 702 may be received directly from a charge-coupled device (CCD) or other image sensor component, e.g., without preliminary processing. In some examples, the raw output data 702 may include 5 megapixel (MP) raw images.

The image processor may perform various raw image corrections on the raw output data 702. Examples of raw image corrections that may be performed include, vignette correction (704), raw corrections (706), de-Bayer (708), de-Noise (710), sharpen (712), gamma correction (714) and saturation enhancement (718). These corrections may be performed for the inputs from each image sensor.

In parallel to the described corrections, the image processor may, at 710, collect and analyze statistics based on the raw image data coming from each image sensor. The statistics may be used to determine new parameters, such as global white balance, gain adjustment (e.g., for each image sensor) and a gain map to improve the final image quality and adjust image sensor settings for the subsequent frame. Example statistics may include, a 64 bin histogram of the approximated luma for each frame, an average color (all 3 channels) for individual patches in each frame (e.g., where each image may be divided into at most 64×64 patches). The number of bins in the histogram and the number of patches (in X and Y) in the statistics are not limited to 64. Sixty-four bins and sixty-four patches are number selected for a specific implementation.

The image processor may utilize the collected statistics to determine the appropriate gain adjustment for a subsequent frame (at time t+1). For example, the image processor may, at 708, individually adjust the image sensor gain for some or all of the image sensors. This feedback loop may dynamically adjusts image sensor gain for each individual image sensor, ensuring that the optimal gain settings are used for the subsequent frame capture (at time t+1) given the data collected at time t. This allows for improved exposure settings across image sensors in variable or changing lighting conditions. Because the image sensor gain is controlled independently for each image sensor, the image sensors may have more accurate settings given their respective lighting conditions and may have less noise than implementations where a general or pre-set gain setting is applied to all image sensors in the system.

Figure 11B:
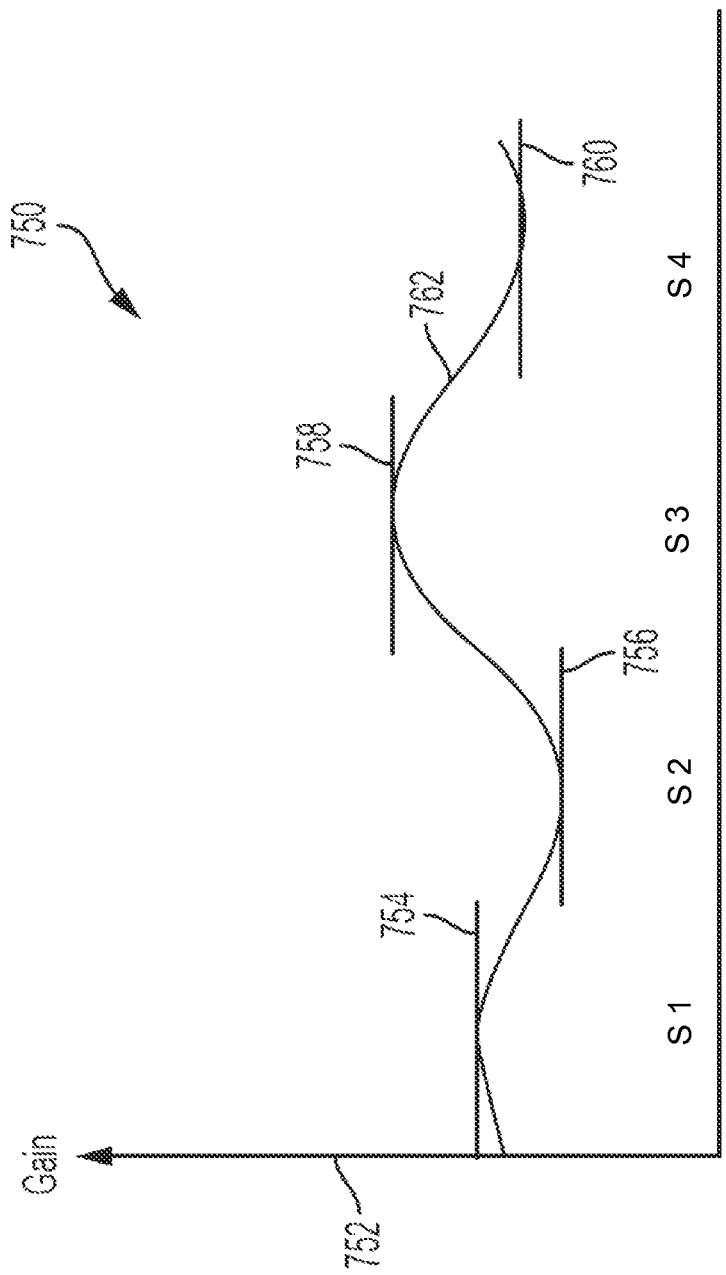
FIG. 11B is a chart showing one example of a gain map created for four example image sensors.

Although the gain for each image sensor may be computed independently, it may be desirable to avoid significant gain differences between different image sensors, which may result in noticable seams in the stitched frame 736. To achieve this, the image processor may apply a gain map gradient 734 to each of the frames. The gain map gradient may correct for the gain difference between the images, resulting in a continuous, but variable, gain across the stitched frame 736. In some examples, the gain map 734, generated at 724, may be a best-fit, smoothed polynomial equation based on the individual gain levels for each image sensor. At the center of each image sensor, the gain level may be set at, or near, the level determined for each sensor, but may smoothly increase or decrease away from the center towards the adjacent image sensor's respective gain value. In this way, the gain map may be made across the entire stitched frame. This may allow for improved image quality in the final stitched image because it reduces the effects of variable lighting conditions not only between image sensors, but also across individual image sensor sensors. The gain map 734 can be used when generating the final panoramic image 736 to brighten the dark areas of the image and darken over-exposed areas of the image. In various examples, the final panoramic image 736 may be a a stand-alone image and/or may be a frame of a panoramic video. FIG. 11B is a chart 750 showing one example of a gain map 762 created for four example image sensors, labeled Cam1, Cam2, Cam3 and Cam4. Frames 754, 756, 758, 760 are positioned on a gain axis 752 as a position indicating the individual gain level for the corresponding image sensors Cam1, Cam2, Cam3, Cam4. As illustrated, the gain map 762 smoothly increases or decreases away from the center of each of the frames 754, 756, 758, 760 toward the gain level of the image sensor that captured the adjacent frame.

Referring back to FIG. 11A, the statistics gathered at 710 may also be used by the image processor to determine an ideal white balance for each image sensor at 720. The image processor may use the statistics, including ideal white balance settings for each image sensor, gain settings for each image sensor, and histograms and statistics to determine a global white balance setting 722 that will be applied to all image sensors. Using a single global white balance setting may allow for improved color accuracy and consistency across all image sensors. If each image sensor determines it's white balance setting independently, color variation may be more apparent across the panoramic image. In some examples, the image processor may determine the global white balance by taking a weighted average of white balance settings from each image sensor and/or using the median white balance setting from each image sensor.

In some examples, if the illumination for all four image sensors is similar, the white balance for all image sensors may be identical. To generate the best final image quality in settings where each image sensor does not have an identical white balance setting, the image processor may select a global white balance 722 that is optimized for the entire panoramic image. In an example panoramic camera system with four image sensors, the image processor may first calculate the optimal white balance for each of the four image sensors. Then, the image processor may choose the three images which best agree on the white balance parameters and average between them (or select the white balance value if all three image sensors have identical white balance settings) and apply the resulting global white balance parameter to all four image sensors. For scenarios where the white balance setting is different for each image sensor, or where half of the image sensors have a single white balance setting, and half of the image sensors have a single, but different white balance setting, a pre-determined white balance setting will be used for those scenarios. If two sensors have identical white balance settings, and the other two sensors have differing white balance settings, the image processor may select the most popular white balance setting as the global white balance parameter.

In some examples, the image processor may create a stitching map using distortion parameters that are pre-set on the panoramic camera system. Distortion parameters may be pre-set values or may be calibrated on a per-system level at the factory when manufactured. Examples for determining the distortion parameters are described herein, for example, above. Alignment parameters, described herein, may include angles of offset and rotation between adjacent image sensors. Alignment parameters can be either measured at the factory and saved locally on the panoramic camera system, or they can be calculated dynamically by the image processor, for example, using key point detection and matching processes.

Combining the processed raw image data from each sensor 730, the stitching map 732, and the gain map 734 may allow the image processor to generate a single stitched frame from multiple discrete frames. Because each raw frame is subject to the global white balance setting, each discrete frame may have even white balance. The final stitching method can vary depending on the application and may be performed, for example, as described herein with respect to FIGS. 8-9. In some examples, the image processor may utilize a dynamic stitching map 732 to implement seam carving. A dynamic stitching map may be created on a frame-by-frame basis by tracking object movement into the stitch area, and/or by recognizing a single seam has a relatively large error and adjusting the location of the seam to reduce the error within that specific image overlap.

In some examples, the panoramic camera system may utilize a rolling average of prior settings (e.g., gain maps, white balances, global white balances, etc.) to prevent rapid and inadvertent changes between white balance or gain settings. This may reduce flickering caused by sudden changes to the gain map or white balance. For example, if a single image sensor is subject to rapidly changing lighting conditions (due to movement, sunlight/shade, or some other factor), the panoramic camera system may use a rolling average of prior settings to determine the optimal setting for the next frame.

Figure 12:
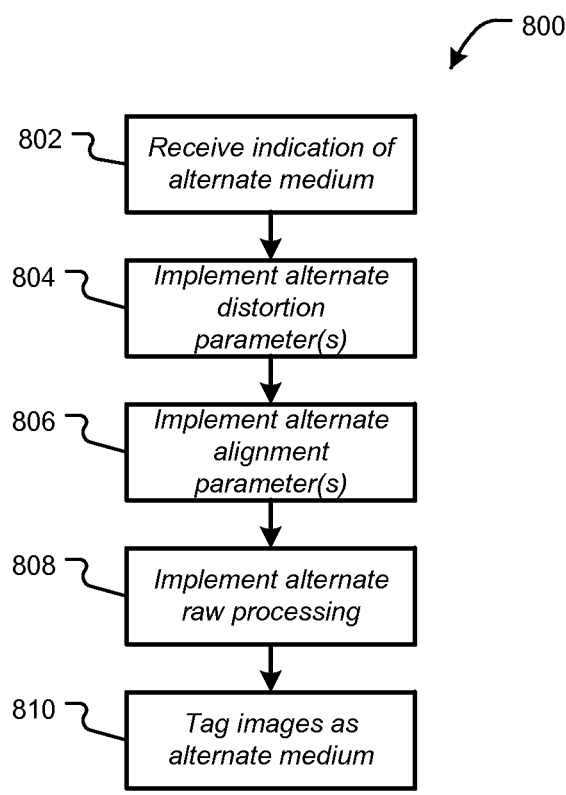
FIG. 12 is a flow chart showing one example of a process flow for modifying the output of a panoramic camera system when the camera system is used in an alternate medium.

In various examples, a panoramic camera system may be configured to modify the processing of frames when the panoramic camera system is utilized in an alternate medium. FIG. 12 is a flow chart showing one example of a process flow 800 for modifying the output of a panoramic camera system when the panoramic camera system is used in an alternate medium. The process flow 800 may be executed, for example, by an image processor of the panoramic camera system. At 802, the image processor may receive an indication that the system is in use in an alternate medium. Any suitable indication may be received. In some examples, the panoramic camera system may have a switch or other sensor that provides a signal when the enclosure is in place around the mounting assembly. For example, referring to FIG. 1, the mounting assembly 8 comprises a switch 9 that is actuated when the enclosure 10 is placed around the mounting assembly. When the switch 9 is actuated, it may provide a signal indicating the presence of the enclosure 10. Any other suitable sensor may be used to detect the presence of the enclosure including, for example, a proximity sensor, etc. The switch 9, for example, may comprise a pin that extends through the mouting assembly 8 to a switch element.

In some examples, the image processor may receive the indication that the system is in use in an alternate medium from frames generated by the image sensors. For example, the image processor may analyze frames generated by the image sensors. In some examples, even with an enclosure in place, using a panoramic camera system submerged in an alternate medium may change the optical properties of the system. The image processor may detect, for example, a change in the overlap between the effective fields-of-view of adjacent image sensors, a change in image sensor distortion parameters, etc. Regarding distortion parameters, the image processor may trace straight lines in a frame. If a line is straight in one position and curved at the edges, it may be an indication that the distortion parameters being applied by the panoramic camera system do not match the medium. In some examples, the image processor may receive an instruction from a user to indicate that the system is in use or is to be used in an alternate medium. The instruction may be received when a user actuates a switch on the device (e.g., switch 9). In some examples, the panoramic camera system may be in communication with another computing device (e.g., a mobile device 832a, 832n in FIG. 13), for example, via a Universal Serial Bus (USB), Bluetooth, Wi-Fi, or other suitable connection. A user may utilize the other computing device to provide the panoramic camera system with the instruction indicating that the system is in use or to be used in an alternate medium.

When the panoramic camera system receives the indication of an alternate medium it may take various actions to modify the processing of frames received from the image sensors. Actions 804, 806, 808, 810 are example actions that the panoramic camera system may take to adjust to an alternate medium. Not all of these actions will be taken in every example. Also, additional actions not shown in FIG. 12 may also be taken.

At 804, 806, and 808, the panoramic camera system may apply one or more alternate medium stitching parameters such as, for example, alternate medium distortion paramters (804), alternate medium alignment parameters (806), and/or alternate medium raw processing parameters (808). Alternate medium stitching parameters may be derived by the panoramic camera system when it is determined that the system is in an alternate medium and/or may be stored as part of an alternate medium calibration. Stored alternate medium calibrations may be determined, for example, after the panoramic camera system is manufactured. Stored alternate medium calibrations may be stored at the panoramic camera system (e.g., at a data storage or memory of the control circuit) and/or at a remote location (e.g., at one or more remote servers such as a cloud service). The panoramic camera system may be provided with stored calibrations for various mediums including, for example, a stored in-air calibration and a stored alternate medium calibration, such as a stored underwater calibration. Stored calibrations may be crelated while the panoramic camera system, or a similar system, is submerged in water or another alternate medium.

At 804, the panoramic camera system may implement one or more alternate medium distortion parameters for the image sensors. When the alternate medium is water, the alternate medium distortion parameter may be an underwater distortion parameter. In some examples, even when the disclosed enclosures are used, the distortion properties of the image sensors may be different in the alternate medium. Accordingly, the panoramic camera system may implement one or more alternate medium distortion parameters for the alternate medium. The alternate medium distortion parameters may be found in any suitable manner. For example, the panoramic camera system may derive alternate medium distortion parameters with the alternate medium is detected, for example, as described herein with respect to FIG. 8. In some examples, the panoramic camera system may retrieve a stored alternate medium calibration comprising the alternate medium distortion parameters. The alternate medium distortion parameters may be applied by the image processor at 804.

At 806, the panoramic camera system may implement one or more alternate medium alignment parameters. For example, the curvature radius of the curved outer surface or surfaces of the enclosure may be selected to minimize differences in field-of-view overlap between adjacent image sensors, however, some differences may still exist. When the alternate medium is water, the alternate medium alignment parameter may be an underwater alignment parameter. The panoramic camera system may apply alternate medium alignment parameters, as described herein, to correct for the differences, if any. Alternate medium alignment parameters may be determined by the image processor when the alternate medium is detected. For example, when the alternate medium is detected (e.g., when the panoramic camera system including the enclosure is submerged in the alternate medium), the image processor may determine alternate medium alignment parameters, for example, as described with respect to FIG. 8 (utilizing a calibration fixture and test pattern) and/or as described with respect to FIG. 10.

At 808, the panoramic camera system may implement one or more alternate mediume raw processing operations or parameters. For example, referring to FIG. 11A, when the panoramic camera system is used with the enclosure in an alternate medium, the image processor may be configured to apply different processing algorithms, and/or processing algorithms with different parameters. For example, the image processor may modify vignette corrections 704, raw corrections 706, de-Bayer corrections 708, de-noise corrections 710, sharpening corrections 712, gamme corrections 714, saturation corrections 718, etc. Also, in some examples, the image processor may modify white balance 722 and/or the gain map 734 based on the alternate medium. For example, when the alternate medium is ocean water, the image processor may be programmed to modify the white balance 722 to filter out excessive blue, which may increase frame quality. Also, for example, when the alternate medium is river water, the image processor may be programmed to modify the white balance 722 to filter out excessive brown. This may result in an alternate medium white balance (or underwater white balance when the alternate medium is water). Also, the gain map 734 may be modified to account for different lighting conditions in the alternate medium. The image processor may implement alterante raw processing operations in any suitable manner. For example, the image processor may store changes to algorithms or parameters for raw processing operations 704, 076, 708, 710, 712, 714, etc. When the image processor receives an indication that it is in the alterante medium, it may apply the stored changes. Also, in some examples, the statistics 711 may change as the panoramic camera system is used in the alterante medium. Accordingly, the image processor may make modifications to the gain adjustments 709 (applying an alternate medium gain to one or more image sensors), to the gain map 734 (applying an alternate medium gain map), to the global white balance 722 (applying an alternate medium global white balance). For example, the alternate medium gain, alternate medium gain map, and/or alternate medium global white balance may be generated by the image processor as new statistics are generated, as described with respect to FIG. 11A.

At 810, the image processor may affix tags to frames, stitched frames, and/or videos generated by the panoramic camera system after receiving the indication at 802. A tag may indicate that the tagged frame, stitched frame, and/or video was captured while the panoramic camera system was submerged in the alternate medium. Tags may be attached to individual frames and/or to a complete video. Also, for example, tags may be attached before or after stitching occurs. The tags may be used in any suitable manner. In some examples, the image processor may also be programmed to modify audio associated with a stitched frame and/or a video comprising stitched frames. For example, the image processor may be configured to filter audio signals to remove extraneous sounds occurring in the alternate medium. For example, when the alternate medium is water, sounds such as the operation of breathing equipment, etc. may be filtered from an audio track.

In some examples, tags indicating that a frame, stitched frame, or video was captured in an alternate medium may be utilized by a content curation service to create a summary video organized according to a theme. In some examples, the theme may be selected automatically considering the content of the input video and/or images. In some examples, a user may select a theme. Example themes may include types of events (e.g., birthday parties, graduation, wedding, etc.), locations (e.g., vacation destinations, etc.), songs or other types of music, etc. The content curation service may select, edit and aggregate videos and/or images into a summary video in a manner matching the theme.

Figure 13:
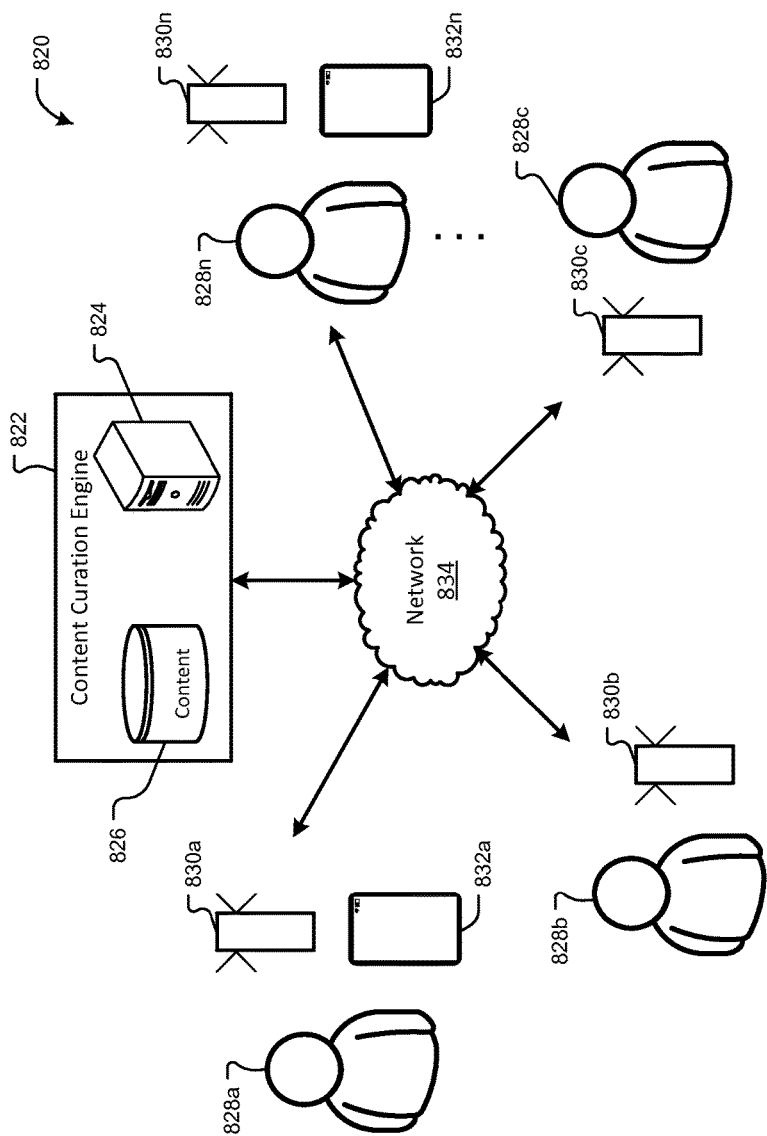
FIG. 13 is a diagram showing one example of an environment for implementing a content curation service.

FIG. 13 is a diagram showing one example of an environment 820 for implementing a content curation service.

The environment comprises a content curation engine 822, users 828a, 828b, 828c, 828n and associated panoramic camera systems 830a, 830b, 830c, 830n. Some of the users 828a, 828n may also have associated mobile devices 832a, 832n. Although four users 828a, 828b, 828c, 828n, four panoramic camera systems 830a, 830b, 830c, 830n and two mobile devices 832a, 832n are shown, any suitable numbers of these components may be used.

The content curation engine 822 may comprise one or more data stores 826 and one or more servers 824. The data store 826 may store videos and/or images received from the various panoramic camera systems 830a, 830b, 830c, 830n and/or summary videos generated by the content curation engine 822. The various components 824, 826 of the content curation engine 822 may be at a common geographic location and/or may be distributed across multiple geographic locations. For example, the content curation engine 822 may be implemented in whole or in part in a cloud system. The various components of the environment 820 may be in communication with one another via a network 834. The network 834 may be and/or comprise any suitable wired or wireless network configured according to any suitable architecture or protocol. In some examples, the network 834 may comprise the Internet.

The panoramic camera systems 830a, 830b, 830c, 830n may capture images and/or videos as described herein. For example, the panoramic camera systems 830a, 830b 830c, 830n may capture frames from multiple image sensors and stitch the frames into images and/or video as described herein. In some examples, panoramic camera systems 830a, 830b, 830c, 830n may be under the control of a user 828a, 828b, 828c, 828n. Images and/or video captured by the panoramic camera systems 830a, 830b, 830c, 830n may be provided to the content curation engine 822, via the network 834. The content curation engine 822 may aggregate input images and/or video into summary videos, as described herein. For viewing, the content curation engine 822 may transmit the summary videos to any suitable devices including, for example, one or more of mobile devices 832a, 832n, or any other suitable device.

Figure 14:
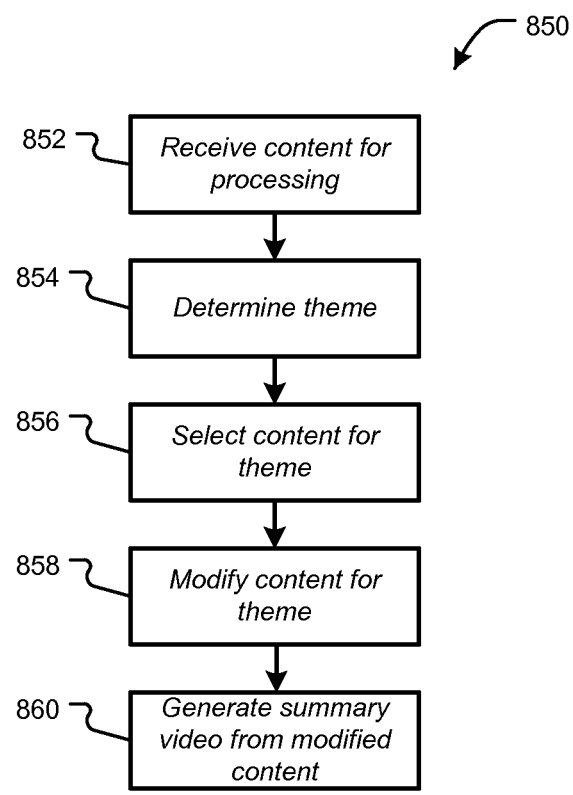
FIG. 14 is a flow chart showing one example of a process flow that may be executed by the content curation engine to create a summary video.

FIG. 14 is a flow chart showing one example of a process flow 850 that may be executed by the content curation engine 822 to create a summary video. At 852, the content curation engine 822 may receive content for processing. The content may include stitched frames and/or videos (e.g., made up of stitched frames) to be included in the summary video. In some examples, the content comprises stitched frames and/or video received from the various panoramic camera systems 830a, 830b, 830c, 830n. Content may be transmitted from the panoramic camera systems 830a, 830b, 830c, 830n to the content curation engine 822 in any suitable manner. For example, a user 828a, 828b, 828c, 828n may instruct the panoramic camera system 830a, 830b, 830c, 830n to upload content to the content curation engine 822, for example, utilizing an interface of the panoramic camera system 830a, 830b, 830c, 830n and/or an interface of an associated mobile device 832a, 832n. In some examples, the user 828a, 828b, 828c, 828n may place the panoramic camera system 830a, 830b, 830c, 830n on a dock (not shown). When the system is placed in the dock, it may automatically upload content to the content curation engine 822.

At 854, the content curation engine 822 may determine a theme for the summary video. In some examples, the theme may be selected automatically. For example, the content curation engine 822 may be programmed to analyze some or all of the content received at 852. In some examples, the content curation engine 822 may perform optical character recognition (OCR) in the content to identify recurring words, such as signs reading "birthday," "marriage," "anniversary," etc. Such recurring words may provide an indication of a common theme. Also, in some examples, the content curation engine 822 may execute one or more object recognition algorithms to identify objects present in the videos. Such objects may also provide an indication of a common theme. For example, videos or images showing a birthday cake may be associated with a birthday, etc. In some examples, a user 828a, 828b, 828c, 828n may manually select a theme. For example, the user 828a, 828b, 828c, 828n may communicate a theme to the content curation engine 822 via a panoramic camera system 830a, 830b, 830c, 830n and/or via a mobile device 832a, 832n.

At 856, the content curation engine 822 may select content to be included in the summary video. For example, the content curation engine may select content that includes text (e.g., photographed signs) and/or objects related to the theme. If the theme, for example, is a birthday party, the content curation engine 822 may select content that includes images of a birthday cake, a sign reading happy birthday, people wearing birthday hats, etc. Content that does not include text and/or objects related to the theme may not be included in the summary video. In some examples, the theme may be and/or indicate a subject object or objects. For example, a birthday theme may be associated with the individual having the birthday. The content curation engine 822 may search the received content for other instances of the face or other recognizable feature of the subject object. Content including an example of a subject object may be more likely to be included in the summary video.

At 858, the content curation engine 822 may modify content in accordance with the theme. Content may be modified in any suitable manner. For example, panoramic images and/or video may be cropped to emphasize objects and/or text related to the theme. Also, for example, the length of video clips may be modified in accordance with a mood and/or tempo of the summary video. For example, when the mood or tempo of the summary video is upbeat or fast, the video clips may be cut to a shorter length. At 860, the content curation engine 822 may generate the summary video from the modified content. For example, the content curation engine 822 may aggregate the modified content and, optionally, set it to music. A song for the summary video may be selected by the content curation engine 822 automatically, and/or may be selected by the user 828a, 828b, 828c, 828n.

In some examples, content curation, for example, as described in FIG. 14, may be modified when some or all of the content is tagged as captured underwater or in another alternate medium. For example, referring to 854, the content curation engine 822 may determine a theme for a summary video considering that it was captured underwater or in another alternate medium. For example, when content is captured underwater, the content curation engine 822 modify object recognition algorithms executed on the received content to look for water-oriented objects such as scuba gear, fish, snorkels, diving masks, etc. Also, for example, facial recognition algorithms may be modified to consider that objects, such as human faces, may look different underwater or in an alternate medium (e.g., diving masks may cause human faces to appear more square-like than round). Differences in object recognition algorithms may also be applied at 856 and 858. For example, referring to 856, the content curation engine 822 may select underwater-tagged content for inclusion in the summary video based on the presence or absence of underwater objects, as described above. Also, for example, the content curation engine may modify underwater-tagged content for inclusion in a summary video based on the location of underwater objects. Referring to 860, when underwater-tagged content is included in a summary video, the content curation engine 822 may select for the summary video music having lyrics and/or a tune that relates to or evokes an underwater environment.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A panoramic camera system, comprising:
    a cylindrical housing;
    a first image sensor coupled to the cylindrical housing and directed perpendicular to a central axis of the cylindrical housing;
    a second image sensor coupled to the cylindrical housing and directed perpendicular to the central axis;
    a removable enclosure, wherein the enclosure comprises a curved outer surface having a constant curvature radius, wherein the first image sensor and the second image sensor are positioned within the enclosure and effective to capture image data through the curved outer surface having the constant curvature radius, wherein an in-air field-of-view of the first image sensor overlaps an in-air field of view of the second image sensor by greater than a threshold amount when the first image sensor and the second image sensor are outside the enclosure and the panoramic camera system is in air, and wherein an alternate medium field-of-view of the first image sensor through the curved outer surface when the panoramic camera system is in water overlaps an alternate medium field-of-view of the second image sensor through the curved outer surface when the panoramic camera system is in water; and
    an image processor, wherein the image processor is programmed to:
        receive an indication that the first image sensor and the second image sensor are positioned within the enclosure;
        receive a first frame of image data captured by the first image sensor;
        receive a second frame of image data captured by the second image sensor;
        apply an underwater white balance to the first frame and the second frame;
        apply an underwater distortion parameter to the first frame and the second frame; and
        stitch the first frame and the second frame using an underwater alignment parameter.

2. The system of claim 1, wherein the removable enclosure comprises a second curved outer surface having a second radius, the system further comprising:
    a third image sensor coupled to the cylindrical housing, positioned within the enclosure, and directed towards the second curved outer surface, wherein an in-air field-of-view of the third image sensor is different than the in-air field-of-view of the first image sensor; and a fourth image sensor coupled to the cylindrical housing, positioned within the enclosure, and directed towards the second curved outer surface, wherein an in-air field-of-view of the fourth image sensor is different than the in-air field-of-view of the first image sensor, and wherein an alternate medium field-of-view of the third image sensor overlaps an alternate medium field-of-view of the fourth image sensor.

3. A system comprising:
a panoramic camera system, the panoramic camera system comprising:
an enclosure comprising a curved outer surface having a first curvature radius;
a first image sensor;
a second image sensor, wherein at least one of the first image sensor and the second image sensor is directed towards the curved outer surface and effective to capture image data through the curved outer surface, and wherein an in-air field-of-view of the first image sensor overlaps an in-air field of view of the second image sensor by greater than a threshold amount when the first image sensor and the second image sensor are outside the enclosure and the panoramic camera system is in air; and
an image processor coupled to the first image sensor and the second image sensor, the image processor programmed to:
receive a first frame of image data captured by the first image sensor;
receive a second frame of image data captured by the second image sensor;
determine that the first frame and the second frame were captured while the panoramic camera system was submerged in an alternate medium that is different than air; and
generate a stitched frame based on at least the first frame and the second frame using a stitching parameter associated with the alternate medium.

4. The system of claim 3, wherein the image processor is further programmed to affix a tag to the stitched frame, the tag comprising an indication that the stitched frame was captured while the panoramic camera system was submerged in the alternate medium.

5. The system of claim 4, wherein the image processor is further programmed to send to a content curation engine a panoramic video data comprising the stitched frame.

6. The system of claim 3, further comprising:
a content curation engine, wherein the content curation engine comprises at least one processor and associated memory, and wherein the content curation engine is programmed to:
receive from the image processor a plurality of panoramic videos, wherein at least one of the plurality of panoramic videos comprises the stitched frame;
determine at least one object associated with the alternate medium;
select from the plurality of panoramic videos a set of panoramic videos comprising the at least one object associated with the alternate medium; and
aggregate the set of panoramic videos into a summary video.

7. The system of claim 6, wherein the content curation engine is further programmed to crop a first panoramic video selected from the plurality of panoramic videos to show a portion of the first panoramic video that depicts an instance of the at least one object associated with the alternate medium.

8. The system of claim 3, wherein the image processor is further programmed to retrieve a stored alternate medium calibration, the alternate medium calibration comprising the stitching parameter.

9. The system of claim 3, wherein the stitching parameter includes at least one of an alternate medium distortion parameter, an alternate medium alignment parameter, an alternate medium white balance, or an alternate medium gain.

10. The system of claim 3, wherein determining that the first frame and the second frame were captured while the panoramic camera system was submerged in an alternate medium comprises detecting a change in overlap of a first field-of-view of the first image sensor and a second field-of-view of the second image sensor at least in part by analyzing the first frame and the second frame.

11. The panoramic camera system of claim 3, wherein an alternate medium field-of-view of the first image sensor overlaps an alternate medium field-of-view of the second image sensor by greater than a threshold amount.

12. The system of claim 3, wherein the first image sensor and the second image sensor are directed towards the curved outer surface.

13. The system of claim 12, wherein an alternate medium field-of-view of the first image sensor overlaps an alternate medium field-of-view of the second image sensor by greater than a threshold amount, the system further comprising:
a third image sensor having a third in-air field-of-view that overlaps the in-air field-of-view of the second image sensor by greater than the threshold amount; and
a fourth image sensor and having a fourth in-air field-of-view that overlaps the third in-air field-of-view by greater than the threshold amount.

14. The system of claim 12, wherein the first image sensor and the second image sensor are coupled to a mounting assembly and directed perpendicular to a central axis of the mounting assembly, and wherein the curved outer surface is a figure of revolution around the central axis.

15. The system of claim 3, wherein the enclosure comprises a second curved outer surface having a second curvature radius and wherein an alternate medium field-of-view of the first image sensor overlaps an alternate medium field-of-view of the second image sensor by greater than a threshold amount, the system further comprising:
a third image sensor directed towards the second curved outer surface, wherein the third image sensor has a third alternate medium field-of-view; and
a fourth image sensor directed towards the second curved outer surface, wherein the fourth image sensor has a fourth alternate medium field-of-view, and wherein the third alternate medium field-of-view and the fourth alternate medium field-of-view overlap by greater than the threshold amount.

16. The system of claim 15, wherein the third image sensor and the fourth image sensor have a common in-air field-of-view, and wherein the common in-air field-of-view of the third image sensor and the fourth image sensor is different than the in-air field-of-view of the first image sensor and the in-air field-of-view of the second image sensor.

17. The system of claim 3, wherein the first image sensor and the second image sensor are coupled to a mounting assembly, and wherein the enclosure is a truncated sphere, wherein an equator of the truncated sphere is positioned at a horizontal center of the mounting assembly.

18. The system of claim 11, wherein the threshold amount is between 0.7 degrees and 3 degrees.

19. The system of claim 3, wherein the first image sensor and the second image sensor are coupled to a mounting assembly, and wherein the enclosure comprises at least one vertical mounting feature in contact with the mounting assembly when the mounting assembly is in the enclosure.

* * * * *